(12) United States Patent
Kang et al.

(10) Patent No.: US 12,027,120 B2
(45) Date of Patent: Jul. 2, 2024

(54) GROUND ISOLATION SYSTEMS AND METHODS

(71) Applicant: Apple Inc., Cupertino, CA (US)

(72) Inventors: Jaeyoung Kang, Palo Alto, CA (US); Baris Cagdaser, Sunnyvale, CA (US); Yaser Azizi, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 37 days.

(21) Appl. No.: 17/889,231

(22) Filed: Aug. 16, 2022

(65) Prior Publication Data

US 2023/0087831 A1 Mar. 23, 2023

Related U.S. Application Data

(60) Provisional application No. 63/245,730, filed on Sep. 17, 2021.

(51) Int. Cl.
*G09G 3/3233* (2016.01)
*G06F 3/041* (2006.01)

(52) U.S. Cl.
CPC ....... *G09G 3/3233* (2013.01); *G06F 3/04164* (2019.05); *G09G 2310/0262* (2013.01)

(58) Field of Classification Search
CPC .......... G09G 3/3233; G09G 2310/0262; G06F 3/04164
USPC .......................................................... 345/76
See application file for complete search history.

(56) References Cited

U.S. PATENT DOCUMENTS

| 8,411,062 | B1* | 4/2013 | Ellis | ............... H03K 19/018521 |
| | | | | 178/18.05 |
| 2013/0321292 | A1 | 12/2013 | Jeon | |
| 2014/0204041 | A1* | 7/2014 | Munechika | ......... G06F 3/04166 |
| | | | | 345/212 |
| 2015/0162323 | A1* | 6/2015 | Taya | ................... H01L 27/0629 |
| | | | | 257/296 |
| 2016/0149033 | A1* | 5/2016 | Ito | ........................ H01L 21/266 |
| | | | | 438/286 |
| 2016/0195961 | A1 | 7/2016 | Ludden | |
| 2017/0012628 | A1* | 1/2017 | Blutman | .................. H03K 5/13 |
| 2018/0032176 | A1* | 2/2018 | Krah | ..................... G06F 3/0418 |
| 2019/0012502 | A1* | 1/2019 | Lin | .................... G06V 40/1365 |
| 2019/0102037 | A1* | 4/2019 | Krah | ..................... G06F 3/0418 |

OTHER PUBLICATIONS

Optocoupling in CMOS, YouTube, https://www.youtube.com/watch?v=MK8I4sUYEUI, Feb. 24, 2021, 3 pages.
Electronic Basics #32: Relays & Optocouplers, YouTube, https://www.youtube.com/watch?v=2BdevOmN-Zk, Oct. 29, 2017, 3 pages.

(Continued)

*Primary Examiner* — Mark Edwards
(74) *Attorney, Agent, or Firm* — Fletcher Yoder, P.C.

(57) ABSTRACT

Circuits, systems, methods, and devices are provided for isolating the first ground domain from the second ground domain while transmitting and receiving data between the two ground domains. The proposed high-voltage ground-isolating level shifter may be formed by AC coupling capacitors and a memory cell. The circuit under the high voltage ground domain may be located in an engineered high-voltage isolation well with a relatively large breakdown voltage.

20 Claims, 15 Drawing Sheets

(56) References Cited

OTHER PUBLICATIONS

CMOS, Wikipedia, last accessed Aug. 29, 2021, 16 pages.
Dick, R., Digital Integrated Circuits—EECS 312, Jun. 15, 2010, 81 pages.
Saraswat, Integrated circuit isolation technologies, Isolation, May 17, 2004, 28 pages.
Blaauw, D., EECS 427 VLSI Design I, http://www.eecs.umich.edu/courses/eecs427/f08/lecture1.pdf, Sep. 2014, 13 pages.
Chapter 2 Fabrication of MOSFETs, http://cc.ee.ntu.edu.tw/~lhlu/eecourses/DE/Chapter2.pdf, last accessed May 16, 2018, 10 pages.
Wayne State University, CMOS Process, http://webpages.eng.wayne.edu/cadence/ECE6570/doc/lect1_1.pdf, last accessed Aug. 29, 2017, 22 pages.

\* cited by examiner

GROUND ISOLATION SYSTEMS AND METHODS

CROSS-REFERENCE TO RELATED APPLICATION

This application claims the benefit of U.S. Provisional Application No. 63/245,730, filed Sep. 17, 2021, and entitled "GROUND ISOLATION SYSTEMS AND METHODS," which is hereby incorporated by reference in its entirety for all purposes.

SUMMARY

This disclosure relates to ground isolation circuitry systems and methods to isolate different ground voltages used within an integrated touch and display panel of an electronic display.

A summary of certain embodiments disclosed herein is set forth below. It should be understood that these aspects are presented to provide the reader with a brief summary of these certain embodiments and that these aspects are not intended to limit the scope of this disclosure.

Electronic displays may be found in numerous electronic devices, from mobile phones to computers, televisions, automobile dashboards, and augmented reality or virtual reality glasses, to name just a few. Electronic displays with self-emissive display pixels produce their own light. Self-emissive display pixels may include any suitable light-emissive elements, including light-emitting diodes (LEDs) such as organic light-emitting diodes (OLEDs) or micro-light-emitting diodes (μLEDs). By causing different display pixels to emit different amounts of light, individual display pixels of an electronic display may collectively produce images.

In some cases, an electronic display may include touch sensors as to enable the electronic display to receive touch-based inputs. In many electronic displays, touch sensors in a touch panel are formed on a touch layer that is separate from a panel of the display pixels. However, integrating the touch sensors and the display pixels into a shared panel may reduce material costs and shrink component footprints within an electronic display.

Integrating the touch sensors and the display pixels into a same panel introduces new technical challenges since ouch sensors use a different ground system that could interfere with a ground system used by other circuits of the electronic device, and thus may cause undesirable display or device operations. Indeed, variable ground voltages of the touch sensors differ from static ground voltages used by other portions of electronic device, and the ground voltages for the touch sensors are toggled between two voltage levels, such as 0 volts (V) and 5V, when sensing touch capacitance. Since the touch sensors use a different ground system of a panel grounding domain, voltages of the panel grounding domain may interfere with a system ground of a system grounding domain used by other circuits of the electronic device, which may cause undesirable display or device operations. For example, one or more system-on-chip (SOCs), one or more power management integrated circuits (PMICs), one or more wireless connectivity chips, any other circuit using the system grounding domain may have operation impacted by the toggling voltages of the panel grounding domain.

Thus, when integrating touch sensors and display pixels in a same display panel, a power domain with a first grounding system for the touch sensors may be isolated from another power domain with a second grounding system used by other circuits of the electronic device via ground isolation circuitry. The ground isolation circuitry may include an isolation well (or a native layer) to increase a breakdown voltage between one or more P-N junctions bisected by the native isolation well to cause the respective P-N junction have a greater breakdown voltage level than what typically complementary metal-oxide-semiconductor (CMOS) circuit offers. By doing so, the ground isolation circuitry may take direct current (DC) voltages using the isolation well characterized with relatively high breakdown voltage levels. Furthermore, capacitively coupled signal paths of the ground isolation circuitry may block DC voltage differences and level-shifts, along with a static random-access memory (SRAM) cell on a receiving end of the ground isolation circuitry. Indeed, by including the native isolation wells, the capacitively coupled signal paths, or SRAM cells on a receiving end, or each of the three, the ground isolation circuitry may isolate the different grounding systems of the display panel, which may provide a technical effect of enabling touch pixel and display pixel integration despite the toggling voltage of the panel grounding domain.

BRIEF DESCRIPTION OF THE DRAWINGS

Various aspects of this disclosure may be better understood upon reading the following detailed description and upon reference to the drawings described below.

DETAILED DESCRIPTION

Figure 1:
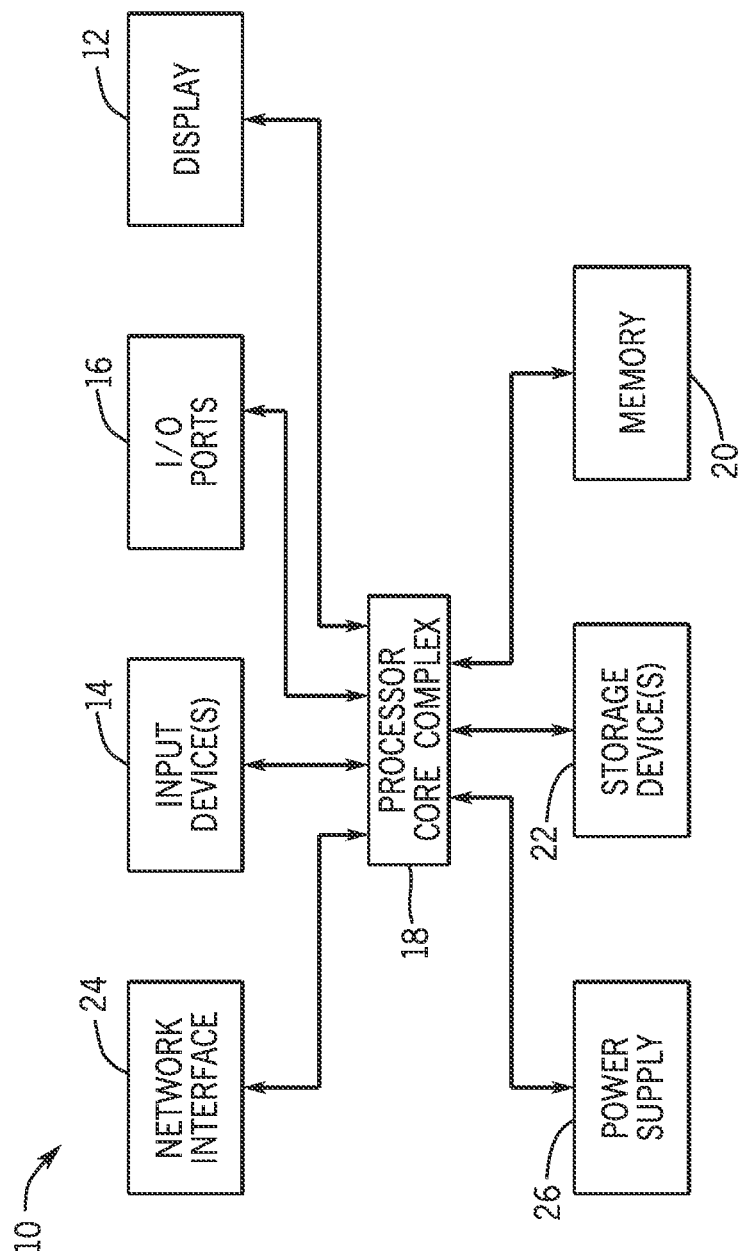
FIG. 1 is a schematic block diagram of an electronic device, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "including" and "having" are intended to be inclusive and mean that there may be additional elements other than the listed elements. Additionally, it should be understood that references to "some embodiments," "embodiments," "one embodiment," or "an embodiment" of the present disclosure are not intended to be interpreted as excluding the existence of additional embodiments that also incorporate the recited features. Furthermore, the phrase A "based on" B is intended to mean that A is at least partially based on B. Moreover, the term "or" is intended to be inclusive (e.g., logical OR) and not exclusive (e.g., logical XOR). In other words, the phrase A "or" B is intended to mean A, B, or both A and B.

The present disclosure provides systems and methods for integrating touch panel and display panels into a single panel. Electronic displays may be found in numerous electronic devices, from mobile phones to computers, televisions, automobile dashboards, wearable devices such as watches, and augmented reality or virtual reality glasses, to name just a few. By causing different display pixels to emit different amounts of light, individual display pixels of an electronic display may collectively produce images. In some cases, an electronic display may include touch sensors as to enable the electronic display to receive touch-based inputs. Touch pixels may be arranged in a touch panel separate from a panel of the display pixels. However, it may be desired to integrate the touch sensors and the display pixels into a shared panel, such as to reduce material costs and to lower component footprints within an electronic display or device.

Integrating the touch sensors and the display pixels into a same panel uses two ground systems—a panel grounding system that toggles its ground voltages and a device grounding system that holds its ground voltages at a static or constant voltage value. For example, ground potential of the touch sensors and display pixels may be toggled between 0 volts (V) and 5V to achieve desired signal-to-noise ratios (SNR) when sensing touch capacitance, against the stable system ground of the electronic (e.g., 0V). Due to both being in the panel grounding domain, display pixels of the panel use the same ground voltage as the touch sensors since display pixel digital data voltages may move together with the panel ground between 0V and 5V (e.g., digital representation of logical low or '0') and 1.29V and 6.29V (e.g., digital representation of logical high or '1').

In modern complementary metal-oxide-semiconductor (CMOS) technology, typical device breakdown voltages are relatively low, such as less than 5V. This relatively low breakdown voltage also occurs with thick-oxide devices. Therefore, additional isolation may be used to isolate the variable ground (e.g., panel grounding domain) from the static ground (e.g., system grounding domain), where the voltage difference between the variable ground and the static ground while toggled may be greater than, equal to, or substantially similar to 5V.

Although beneficial, isolating power supply and ground voltage introduces new challenges since each display pixel is relatively small and since each display has vast quantities of the display pixels. For example, a display-touch integrated panel may include tens of touch sensors and hundreds of thousand, or millions of display pixels.

Indeed, systems and methods for signal isolation that are relatively low cost to implement with relatively small physical footprints are desired. Smaller physical footprints may be desired due to increasingly compact size and increasingly quick performance preferences of the average consumer and/or due to a number of display or touch sensors desired to be guarded. For example, for a display with a large number of display pixels a low footprint isolation system is desired. Due to these sizing concerns, isolation transformers sometimes used when isolating telecommunication systems may have too large a footprint for use in the display-touch integrated panel. Similarly, optocouplers for photo-diode-based isolation also may have too large a footprint due at least to the components used to provide signal isolation based on light toggling methods. These other methods of isolation may also be relatively power intensive. Indeed, systems and methods for signal isolation that are relatively low cost to implement with lower physical footprints and lower power demands are desired.

Furthermore, isolation transformers, optocouplers, as other methods of isolation, tend to use additional packaging and are not inheritable or easily integrated with a standard CMOS device or CMOS process. Thus, isolation systems and methods deployable on a single, integrated chip with display pixel and touch pixel panels, and compatible with footprint constraints, may be desired.

With the foregoing in mind, a ground isolation circuitry may be used to isolate the variable panel grounding system voltages from the static device grounding system voltages. The ground isolation circuitry may also step up or step down a voltage of data transmitted between the two (or more) power domains. This proposed on-chip isolation guarding may include on-chip general purpose input/output (GPIO) circuits. GPIO circuits may be located in the panel ground domain after the ground isolation circuitry.

The ground isolation circuitry may be located in one or more of the suitable high-voltage isolation wells and methods, such as a trench isolation method, high voltage moat isolation methods, silicon-on-insulator (SOI) methods, lowly doped regions or trenches, high-voltage junction engineering systems and methods, or the like. The high-voltage isolation well may be formed from silicon manufacturing additive or blocking methods, such as by blocking dopant materials from being implanted into a substrate layer (e.g., dopant blocking operations), resulting in a portion of the substrate layer being substantially similar to or equal in property to a lowly doped isolation well. The isolation well may provide isolated well separation and prevent well diode breakdown up to or at least at 6.29V (e.g., breakdown above 20V, breakdown above 50V). In some cases, the larger the width of the isolation wells, the larger a voltage difference may be sustained before breakdown occurs. One or more isolation wells may be used in an electronic display to suitably isolate two or more power domains (e.g., grounding domains) from each other. Isolation wells may be repeated on a panel based on a geometry of the electronic display, and thus additional isolation wells may be used in an actual implementation The ground isolation circuitry may include capacitive element coupling to isolate the ground potential differences between the system ground and the panel ground voltage level. Any potential difference between the two ground voltages may be isolated by the two capacitive terminals of the capacitive element. The capacitive element coupling device may include high breakdown voltage metal capacitors (e.g., rated to at least a voltage of 5.09V, rated to 20V, rated to voltages between 20V and 60V, rated to any voltage greater than 60V), which use special spacing to prevent dielectric breakdown by increasing a voltage at which dielectric breakdown occurs.

The ground isolation circuitry may include a device operable to preserve a state of an output voltage and to provide charge to the capacitive element during the panel domain ground voltage transitions. For example, the device may be a memory device, such as a static random-access memory (SRAM) device formed from a back-to-back connected pair of inverters, a latch circuit, or a flip flop. These memory devices are located in the high-voltage isolation well after capacitive coupling devices from the system ground domain. By using the above-described ground isolation circuitry in a level shifter, the output from the level shifter may hold its output at a desired voltage level, permitting ground voltages to be delivered without losing the stage due to leakage current, as the memory device provides the charge to the capacitive coupling devices.

With this in mind, an example of an electronic device 10, which includes an electronic display 12 that may benefit from these features, is shown in FIG. 1. FIG. 1 is a schematic block diagram of the electronic device 10. The electronic device 10 may be any suitable electronic device, such as a computer, a mobile (e.g., portable) phone, a portable media device, a tablet device, a television, a handheld game platform, a personal data organizer, a virtual-reality headset, a mixed-reality headset, a wearable device, a watch, a vehicle dashboard, and/or the like. Thus, it should be noted that FIG. 1 is merely one example of a particular implementation and is intended to illustrate the types of components that may be present in an electronic device 10.

In addition to the electronic display 12, as depicted, the electronic device 10 includes one or more input devices 14, one or more input/output (I/O) ports 16, a processor core complex 18 having one or more processors or processor cores and/or image processing circuitry, memory 20, one or more storage devices 22, a network interface 24, and a power supply 26. The various components described in FIG. 1 may include hardware elements (e.g., circuitry), software elements (e.g., a tangible, non-transitory computer-readable medium storing instructions), or a combination of both hardware and software elements. It should be noted that the various depicted components may be combined into fewer components or separated into additional components. For example, the memory 20 and the storage devices 22 may be included in a single component. Additionally or alternatively, image processing circuitry of the processor core complex 18 may be disposed as a separate module or may be disposed within the electronic display 12.

The processor core complex 18 is operably coupled with the memory 20 and the storage device 22. As such, the processor core complex 18 may execute instructions stored in memory 20 and/or a storage device 22 to perform operations, such as generating or processing image data. The processor core complex 18 may include one or more microprocessors, one or more application specific processors (ASICs), one or more field programmable logic arrays (FPGAs), or any combination thereof.

In addition to instructions, the memory 20 and/or the storage device 22 may store data, such as image data. Thus, the memory 20 and/or the storage device 22 may include one or more tangible, non-transitory, computer-readable media that store instructions executable by processing circuitry, such as the processor core complex 18, and/or data to be processed by the processing circuitry. For example, the memory 20 may include random access memory (RAM) and the storage device 22 may include read only memory (ROM), rewritable non-volatile memory, such as flash memory, hard drives, optical discs, and/or the like.

The network interface 24 may enable the electronic device 10 to communicate with a communication network and/or another electronic device 10. For example, the network interface 24 may connect the electronic device 10 to a personal area network (PAN), such as a Bluetooth network, a local area network (LAN), such as an 802.11x Wi-Fi network, and/or a wide area network (WAN), such as a fourth-generation wireless network (4G), LTE, or fifth-generation wireless network (5G), or the like. In other words, the network interface 24 may enable the electronic device 10 to transmit data (e.g., image data) to a communication network and/or receive data from the communication network.

The power supply 26 may provide electrical power to operate the processor core complex 18 and/or other components in the electronic device 10, for example, via one or more power supply rails. Thus, the power supply 26 may include any suitable source of electrical power, such as a rechargeable lithium polymer (Li-poly) battery and/or an alternating current (AC) power converter. A power management integrated circuit (PMIC) may control the provision and generation of electrical power to the various components of the electronic device 10.

The I/O ports 16 may enable the electronic device 10 to interface with another electronic device 10. For example, a portable storage device may be connected to an I/O port 16, thereby enabling the electronic device 10 to communicate data, such as image data, with the portable storage device.

The input devices 14 may enable a user to interact with the electronic device 10. For example, the input devices 14 may include one or more buttons, one or more keyboards, one or more mice, one or more trackpads, and/or the like. Additionally, the input devices 14 may include touch sensing components implemented in the electronic display 12, as described further herein. The touch sensing components may receive user inputs by detecting occurrence and/or position of an object contacting the display surface of the electronic display 12.

In addition to enabling user inputs, the electronic display 12 may provide visual representations of information by displaying one or more images (e.g., image frames or pictures). For example, the electronic display 12 may display a graphical user interface (GUI) of an operating system, an application interface, text, a still image, or video content. To facilitate displaying images, the electronic display 12 may include a display panel with one or more display pixels. The display pixels may represent sub-pixels that each control a luminance of one color component (e.g., red, green, or blue for a red-green-blue (RGB) pixel arrangement).

The electronic display 12 may display an image by controlling the luminance of its display pixels based at least in part image data associated with corresponding image pixels in image data. In some embodiments, the image data may be generated by an image source, such as the processor core complex 18, a graphics processing unit (GPU), an image sensor, and/or memory 20 or storage devices 22. Additionally, in some embodiments, image data may be received from another electronic device 10, for example, via the network interface 24 and/or an I/O port 16.

Figure 2:
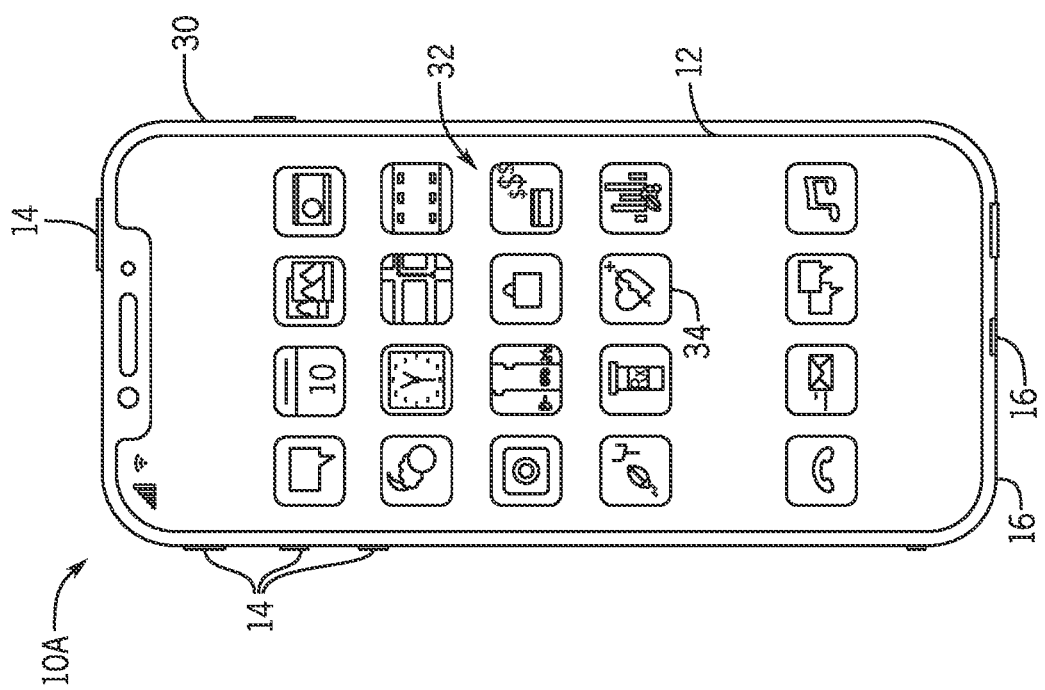
FIG. 2 is a front view of a mobile phone representing an example of the electronic device of FIG. 1, in accordance with an embodiment.

One example of the electronic device 10, specifically a handheld device 10A, is shown in FIG. 2. FIG. 2 is a front view of the handheld device 10A representing an example of the electronic device 10. The handheld device 10A may be a portable phone, a media player, a personal data organizer, a handheld game platform, and/or the like. For example, the handheld device 10A may be a smart phone, such as any iPhone® model available from Apple Inc.

The handheld device 10A includes an enclosure 30 (e.g., housing). The enclosure 30 may protect interior components from physical damage and/or shield them from electromagnetic interference. In the depicted embodiment, the electronic display 12 is displaying a graphical user interface (GUI) having an array of icons 32. By way of example, when an icon 32 is selected either by an input device 14 or a touch sensing component of the electronic display 12, an application program may launch.

Input devices 14 may be provided through the enclosure 30. As described above, the input devices 14 may enable a user to interact with the handheld device 10A. For example, the input devices 14 may enable the user to activate or deactivate the handheld device 10A, navigate a user interface to a home screen, navigate a user interface to a user-configurable application screen, activate a voice-recognition feature, provide volume control, and/or toggle between vibrate and ring modes. The I/O ports 16 also open through the enclosure 30. The I/O ports 16 may include, for example, a Lightning® or Universal Serial Bus (USB) port.

Figure 3:
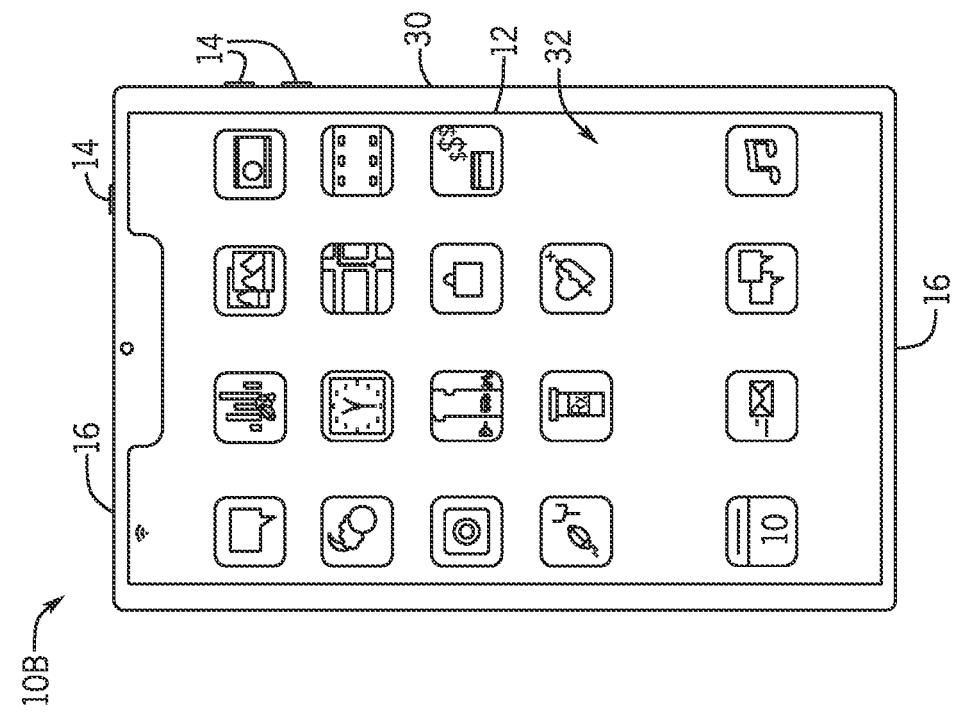
FIG. 3 is a front view of a tablet device representing an example of the electronic device of FIG. 1, in accordance with an embodiment.
Figure 4:
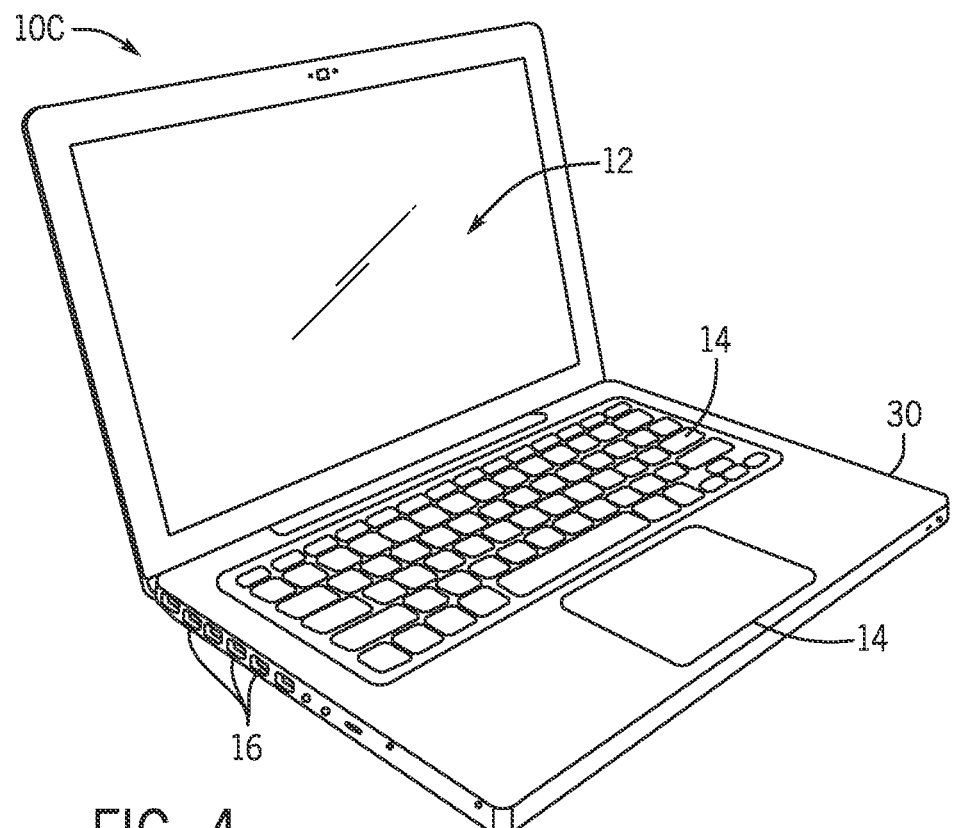
FIG. 4 is a front view of a notebook computer representing an example of the electronic device of FIG. 1, in accordance with an embodiment.
Figure 5:
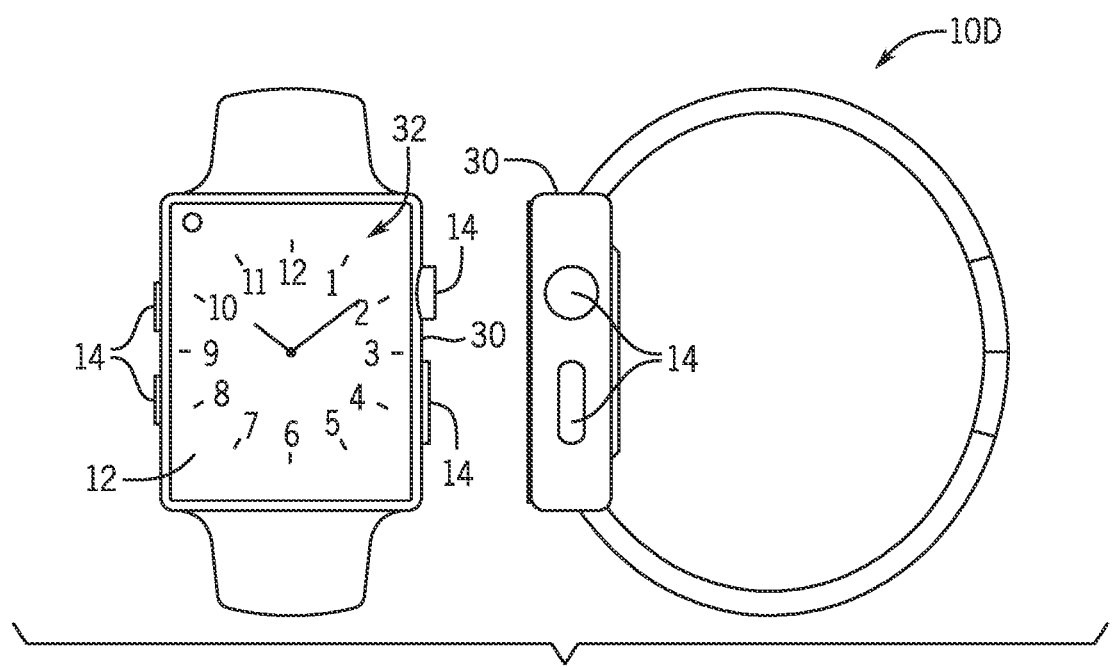
FIG. 5 are front and side views of a watch representing an example of the electronic device of FIG. 1, in accordance with an embodiment.

The electronic device 10 may take the form of a tablet device 10B, as shown in FIG. 3. FIG. 3 is a front view of the tablet device 10B representing an example of the electronic device 10. By way of example, the tablet device 10B may be any iPad® model available from Apple Inc. A further example of a suitable electronic device 10, specifically a computer 10C, is shown in FIG. 4. FIG. 4 is a front view of the computer 10C representing an example of the electronic device 10. By way of example, the computer 10C may be any MacBook® or iMac® model available from Apple Inc. Another example of a suitable electronic device 10, specifically a watch 10D, is shown in FIG. 5. FIG. 5 are front and side views of the watch 10D representing an example of the electronic device. By way of example, the watch 10D may be any Apple Watch® model available from Apple Inc. As depicted, the tablet device 10B, the computer 10C, and the watch 10D all include respective electronic displays 12, input devices 14, I/O ports 16, and enclosures 30.

Figure 6:
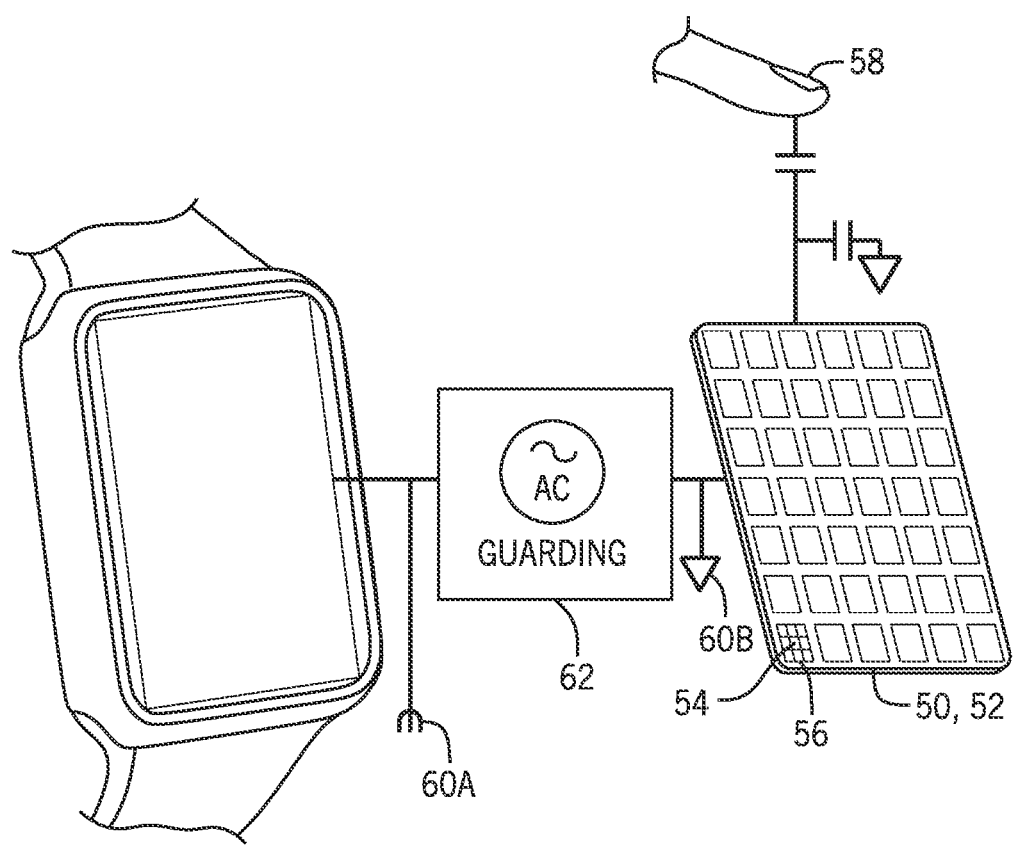
FIG. 6 is a diagrammatic representation of a touch sensor array and a display pixel array integrated in an electronic display of the electronic device of FIG. 1, in accordance with an embodiment.

Keeping the foregoing in mind, FIG. 6 is a diagrammatic representation of a portion of the electronic device 10 using first ground 60A and an integrated display pixel array 50 and touch sensor array 52 (e.g., integrated image pixel and touch sensor array 126 of FIG. 9) using a second ground 60B. The first ground 60A and the second ground 60B may be separated by alternating coupling (AC) systems and methods, such as ground isolation circuitry 62 described herein. The first ground 60A may provide ground voltages to a system grounding domain (e.g., system grounding domain 128 of FIG. 9). When the electronic device 10 is powered through battery power, the first ground 60A may be a ground of the battery (e.g., a battery referred ground). As generally represented in FIG. 6, the display pixel array 50 includes many display pixels 54 and the touch sensor array 52 includes many touch pixels 56 or touch sensing regions formed at intersections of touch sensing-related electrodes (e.g., intersection of row electrodes and column electrodes). Touch pixels 56 may associate several display pixels 54 to a sensing region, and thus there may be a greater number of the display pixels 54 than the touch pixels 56.

The display pixel array 50 and the touch sensor array 52 may use a different ground system than the rest of the electronic device 10 to sense a tactile input 58 to the electronic display 12. The first ground 60A may be kept to a steady voltage level, such as 0V for ground voltages and 0.80V, 0.775V, 0.625V, 1.2V, or any suitable value for power supply voltages. These values are examples and it should be understood that other voltages or values within reasonable deviations from each voltage, such as +/−0.1V, 0.2V, 0.3V or the like. In contrast, the second ground 60B signals may move between different voltage levels, such as an alternating current (AC) waveform between 0V and 5V. In a digital system that is built upon the second ground 60B, the logical low voltages is the ground voltage, following the waveform between 0V and 5V, and the waveform between 1.29V and 6.29V for the logical high voltages (or within reasonable deviations from each voltage, like +/−0.1V, 0.2V, 0.3V or the like). As noted above, changes in value of voltage transmitted as the second ground 60B may be desired to be isolated from the first ground 60A (e.g., system ground). The ground isolation circuitry 62 may isolate the panel grounding system from the device grounding system and do so with a relatively smaller footprint and more desirable operating characteristics, when compared to other isolation methods, such as optocouplers or isolation transformers.

Figure 7:
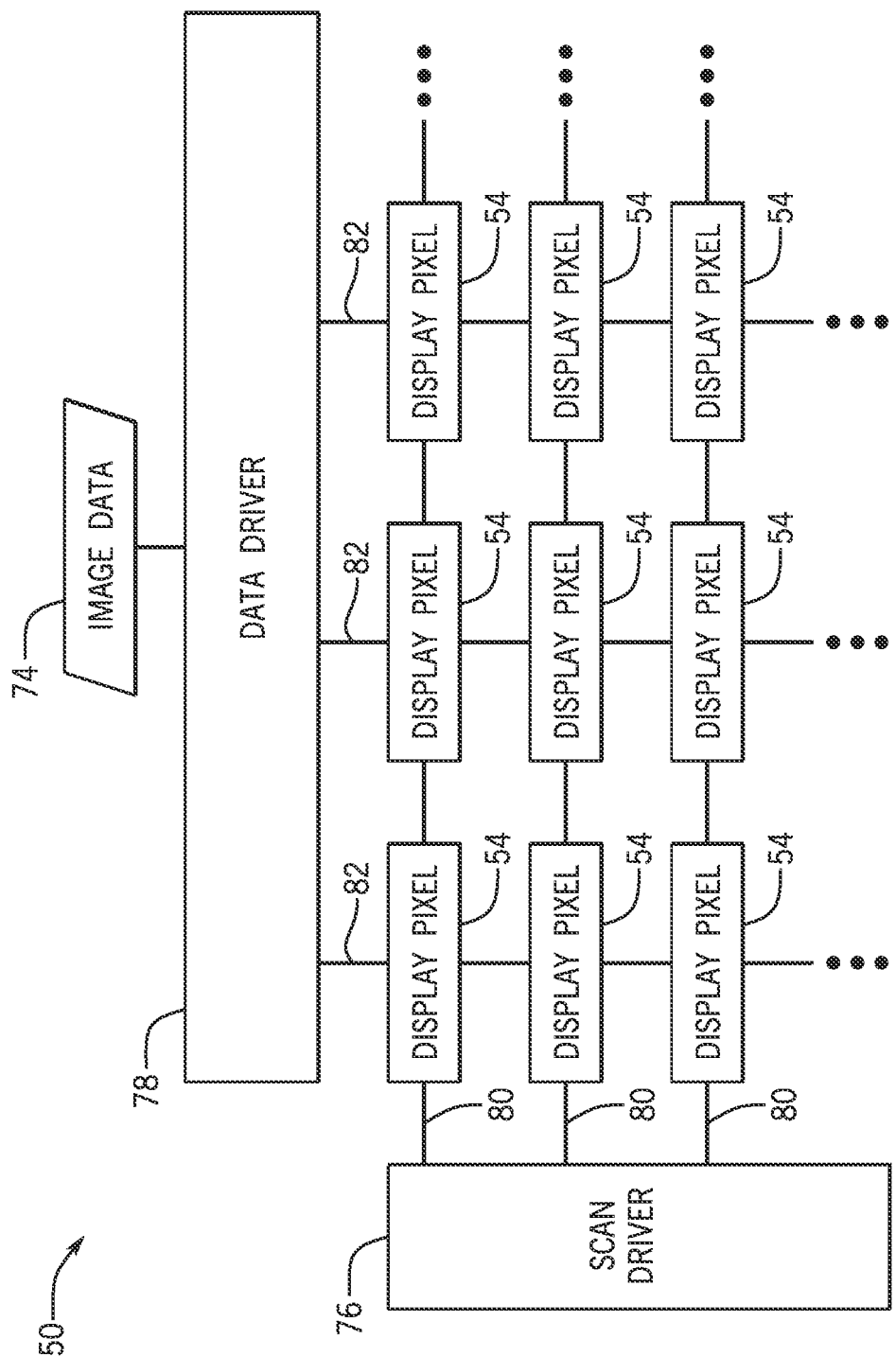
FIG. 7 is a circuit diagram of the display pixel array of FIG. 6, in accordance with an embodiment.

Describing now the display pixel array 50, FIG. 7 is a block diagram of the display pixel array 50 of the electronic display 12. It should be understood that, in an actual implementation, additional or fewer components may be included in the display pixel array 50.

The electronic display 12 may receive image data 74 for presentation on the electronic display 12. The electronic display 12 includes display driver circuitry that includes scan driver 76 and data driver 78. The display driver circuitry controls programing the image data 74 into the display pixels 54 for presentation of an image frame via light emitted according to each respective bit of image data 74 programmed into one or more of the display pixels 54.

The display pixels 54 may each include one or more self-emissive elements, such as a light-emitting diodes (LEDs) (e.g., organic light emitting diodes (OLEDs) or micro-LEDs (μLEDs)), however other pixels may be used with the systems and methods described herein including but not limited to liquid-crystal devices (LCDs), digital mirror devices (DMD), or the like, and include use of displays that use different driving methods than those described herein, including partial image frame presentation modes, variable refresh rate modes, or the like.

Different display pixels 54 may emit different colors. For example, some of the display pixels 54 may emit red light, some may emit green light, and some may emit blue light. Thus, the display pixels 54 may be driven to emit light at different brightness levels to cause a user viewing the electronic display 12 to perceive an image formed from different colors of light. The display pixels 54 may also correspond to hue and/or luminance levels of a color to be emitted and/or to alternative color combinations, such as combinations that use red (R), green (G), blue (B), or others.

The scan driver 76 may provide scan signals (e.g., pixel reset, data enable, on-bias stress) on scan lines 80 to control the display pixels 54 by row. For example, the scan driver 76 may cause a row of the display pixels 54 to become enabled to receive a portion of the image data 74 from data lines 82 from the data driver 78. In this way, an image frame of image data 74 may be programmed onto the display pixels 54 row by row. Other examples of the electronic display 12 may program the display pixels 54 in groups other than by row.

Figure 8:
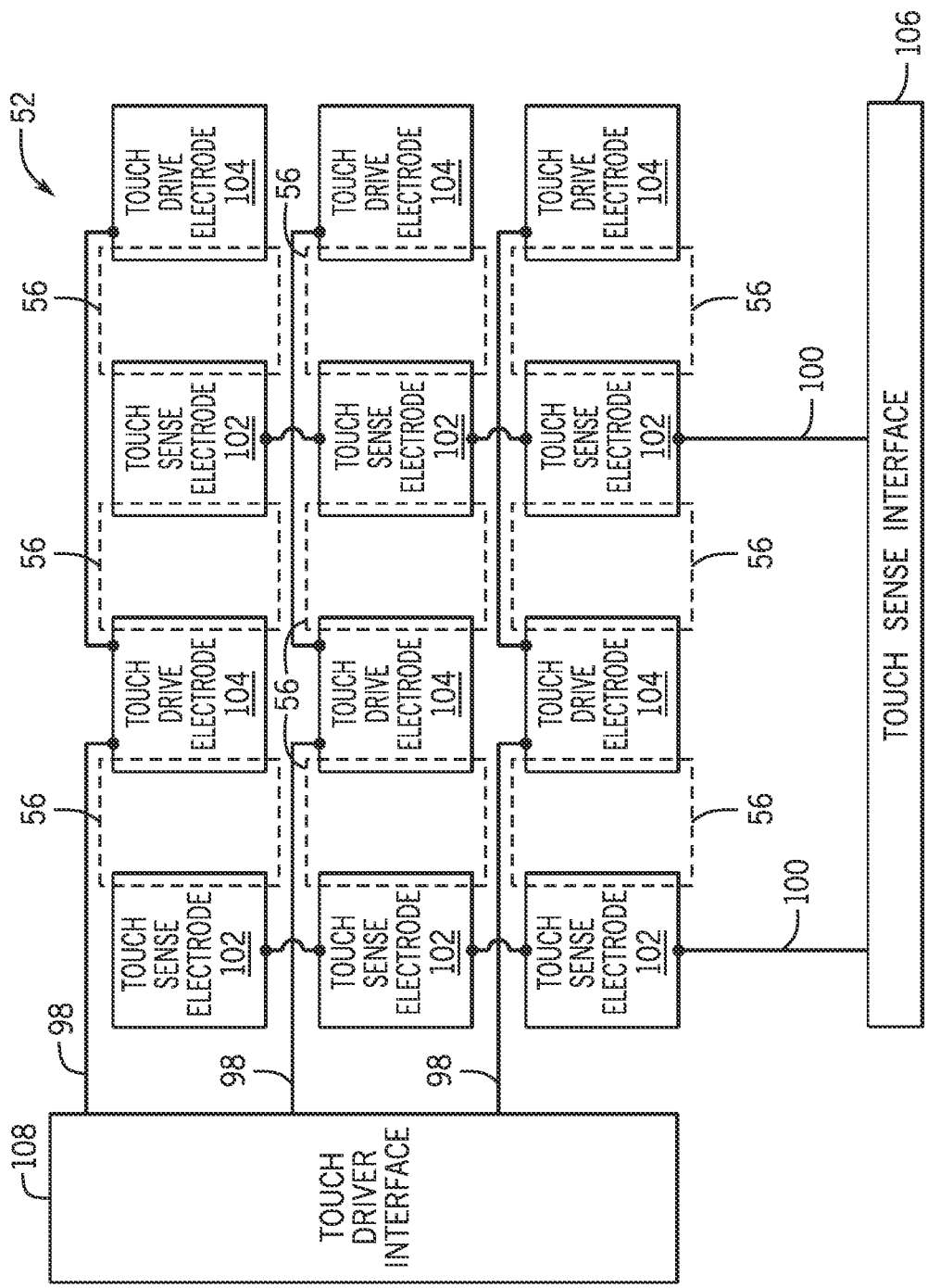
FIG. 8 is a circuit diagram of the touch sensor array of FIG. 6, in accordance with an embodiment.

The display pixel array 50 operates differently than the touch sensor array 52. Referring now to operations of the touch sensor array 52, FIG. 8 is a block diagram of the touch sensor array 52 of the electronic display 12. The touch sensor array 52 and the display pixel array 50 may be integrated and disposed onto a same component, a silicon chip, a board, a panel substrate, or the like, despite having different operations.

The electronic display 12 includes the touch pixels 56 (e.g., any sized matrix of touch pixels 56) arranged as a touch panel array used to sense tactile inputs to the electronic display 12. Interactions between touch drive electrodes 104 and touch sense electrodes 102 form the touch pixels 56, where touch drive electrodes 104 may be disposed in a plane above or below a plane including the touch sense electrodes 102 or in a same plane (as depicted). It should be noted that the terms "lines" and "electrodes" as sometimes used herein simply refers to conductive pathways, and are not intended to be limited to structures that are strictly linear. Rather, the terms "lines" and "electrodes" may encompass conductive pathways that change direction, of different size, shape, materials, and regions. The touch drive electrodes 104 may be driven, for example, by one or more touch drive signals generated by touch driver interface 108 and transmitted via path 98. The touch sense electrodes 102 may be driven, for example, by one or more touch drive signals generated by touch sense interface 106 and transmitted via path 100.

The touch sense electrodes 102 may respond differently to the touch drive signals when an object, such as a finger, is located near the confluence of a given touch drive electrode 104 and a given touch sense electrode 102 (e.g., touch pixel 56). The presence of the object may be "seen" at the touch pixels 56 that may result at an intersection of the touch drive electrode 104 and the touch sense electrode 102. That is, the touch drive electrodes 104 and the touch sense electrodes 102 may form capacitive sensing nodes, or more aptly, the touch pixels 56.

As noted above, challenges arise when combining the display pixel array 50 and the touch sensor array 52. For example, components of the display pixel array 50 may use a same grounding system as components of the touch sensor array 52, which may be a different grounding system than a device grounding system, or the ground used by other components of the electronic device 10. Indeed, the touch sensor array 52 may need a ground voltage to move between a non-boosted level (e.g., 0V) and a boosted level (e.g., 5V) several times in order to sense the capacitance of the human body. Using power regions with isolation systems to define boundaries for the different grounding systems within the electronic device 10 may improve driving of an integrated display and touch panel (e.g., integrated image pixel and touch sensor array 126 of FIG. 9).

Figure 9:
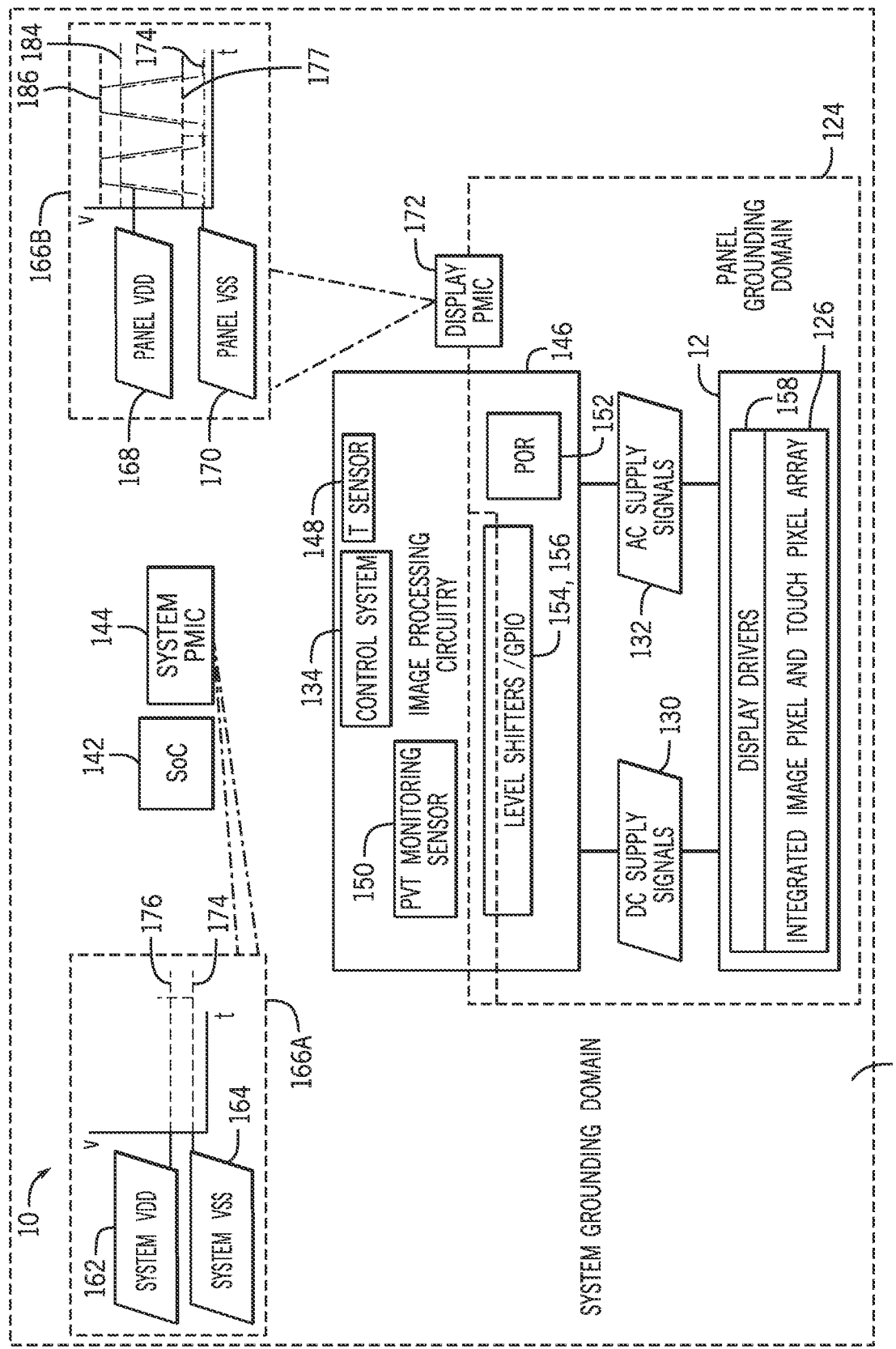
FIG. 9 is a block diagram of a portion of the electronic device of FIG. 1 including image processing circuitry, in accordance with an embodiment.

FIG. 9 is a block diagram illustrating components and a panel grounding domain 124 power region of the electronic device 10 that uses an integrated image pixel and touch sensor array 126. The panel grounding domain 124 includes components and circuits that use digital signals transmitted via the panel grounding system, such as the integrated image pixel and touch sensor array 126. Components in the panel grounding domain 124 may have a different ground voltage from that used in a device or system grounding domain 128 (e.g., system grounding domain 128). Indeed, components in the panel grounding domain 124 sit, or are electrically coupled to, a ground terminal shared with each component on the electronic display 12. Thus, the panel grounding domain 124 uses a panel ground voltage. In contrast, components in the system grounding domain 128 sit on a ground terminal shared with the electronic device 10. The integrated image pixel and touch sensor array 126 integrates components shown in FIG. 7 and FIG. 8 into one panel that uses the panel grounding domain 124. For example, the data driver 78, the scan driver 76, the touch driver interface 108, and the touch sense interface 106 may each be formed with the touch sensor array 52 and the display pixel array 50 on a single substrate. Components disposed in the panel grounding domain 124 may be provided the second ground 60B signals and components disposed outside the panel grounding domain 124 (e.g., inside the system ground domain 128) may be provided the first ground 60A signals.

To elaborate, components in the system grounding domain 128 may include a control system 134 of image processing circuitry 136, an ambient temperature sensor 138, a process-voltage-temperature (PVT) monitoring sensor 140, a system-on-a-chip (SOC) circuit 142, a system power management integrated circuit (PMIC) 144, and may include other components of processing circuitry of the electronic device not specifically depicted in FIG. 9. The SOC circuit 142 may perform general device processing, like application control and execution, and may generate image data for presentation via the electronic display 12 based on applications executing, user inputs, scheduled operations, or the like. The system PMIC 144 may perform power management operations, such as reducing power in response to a determination of idleness of the electronic device 10, managing power gating within the electronic device 10, or the like. It is noted that in some systems, another power-on reset (POR) circuit may be included in the system grounding domain 128 to sense or reset system VDD.

A portion of image processing circuitry 146 may be disposed within the panel grounding domain 124. The control system 134, a temperature sensor 148, and a process-voltage-temperature (PVT) monitoring sensor 150 may each be disposed outside the panel grounding domain 124. A portion of the level shifters 154 may be disposed in the system grounding domain 128 and a portion of the level shifters 154 may be disposed in the panel grounding domain 124. The temperature sensor 148 may sense ambient temperatures and the PVT monitoring sensor 150 may sense silicon wafer manufacturing process variations, such as variations in internal processes, process corners, voltages, and/or temperatures. The POR circuit 152 may reset signals stored in memory or at nodes of the electronic device 10 after a reset involving a power off then a return to a power on state.

The control system 134 may receive image data or an indication of an image to be presented from the SOC circuit 142 or other processing circuitry. The image data may have voltage or current values that cause the integrated image pixel and touch sensor array 126 to present an image frame. In some cases, the control system 134 may instruct the image processing circuitry 146 to generate and/or process image data. The control system 134 may use sensed data obtained by the temperature sensor 148 and/or the PVT monitoring sensor 150 to identify ambient temperatures or PVT data indicative of operating conditions of the electronic device. The control system 134 may adjust, or may instruct the image processing circuitry 146 to adjust, values of the image data to compensate for changes in sensed silicon wafer manufacturing process variations, such as variations in internal processes, process corners, voltages, and/or temperatures, or other operating characteristics prior to the image frame being presented on the electronic display 12. Furthermore, the control system 134 reads touch data from integrated image pixel and touch sensor array 126, processes the touch data to generate a touch gesture image, and returns the touch gesture image to the SoC 142 for further analysis, such as to identify a resulting operation to be performed in response to the tactile input received as the touch data.

The POR circuit 152 may reset signals at the powering on of the electronic device 10 to prepare for touch sensing operations, image presentation operations, or both. Resetting capacitively coupled signals stored on nodes of the level shifters 154 (e.g., stored on a node-side of high-voltage capacitors) may be relatively challenging from the system grounding domain. When back-to-back connected two inverters (e.g., static random access memory (SRAM) cell) of the level shifters 154 are powered-up, the polarity stored by the two inverters is often random. The POR circuit 152 may resolve the random signal stored by the two inverters during power-up by resetting stored voltages of the level shifters 154 nodes, as may be explained in FIG. 13A and FIG. 13B.

One or more level shifters 154 may adjust voltage values of data between the voltages of the panel grounding domain 124 and the voltages of the system grounding domain 128 before the data is buffered by the general purpose input/output pins (GPIOs) 156. Moreover, AC coupling of the level shifters 154 may reject DC supply voltage level mismatch and changes. Indeed, the level shifters 154 and the GPIOs 156 may operate as described herein to provide ground isolation between the ground of system grounding domain 128 and the ground of the panel grounding domain 124.

Inset graph 166A shows example system grounding domain 128 voltages that have respectively stable voltage values (e.g., static voltage levels), such as at 0V 174 (e.g., system ground voltage (VSS) 164) and 1.2V 176 (e.g., system DC supply voltage (VDD) 162). Inset graph 166B shows example panel grounding domain 124 ground voltages that moves up and down, from 0V 174 to 5V 184 (e.g., panel VSS 170) and DC supply voltages that is up from the panel VSS by 1.20V, i.e., from 1.29V 177 to 6.29V 186 (e.g., panel VDD 168, variable supply voltage). The display PMIC 172 may generate power supply voltages and panel grounding voltages for the panel grounding domain 124. The level shifters 154 may change signal voltages between the system grounding domain 128 and the panel grounding domain 124 using power supply voltages and ground voltages received from the system PMIC 144 and/or the display PMIC 172.

The system VDD remains at the 1.2V 176 voltage level while the panel VSS 170 and panel VDD 168 toggle. When the panel VSS 170 equals or is substantially equal to 0V 174 and the panel VDD 168 equals or is substantially equal to 1.29V 177, the touch pixels 56 may be reset and/or prepared for a subsequent touch sensing operation. The touch pixels 56 may be used to sense a capacitance difference present when a finger or object makes tactile contact with a display 12 based on this toggling of voltages. The image processing circuitry 146 may use the capacitance difference to determine a touch image.

Figure 10A:
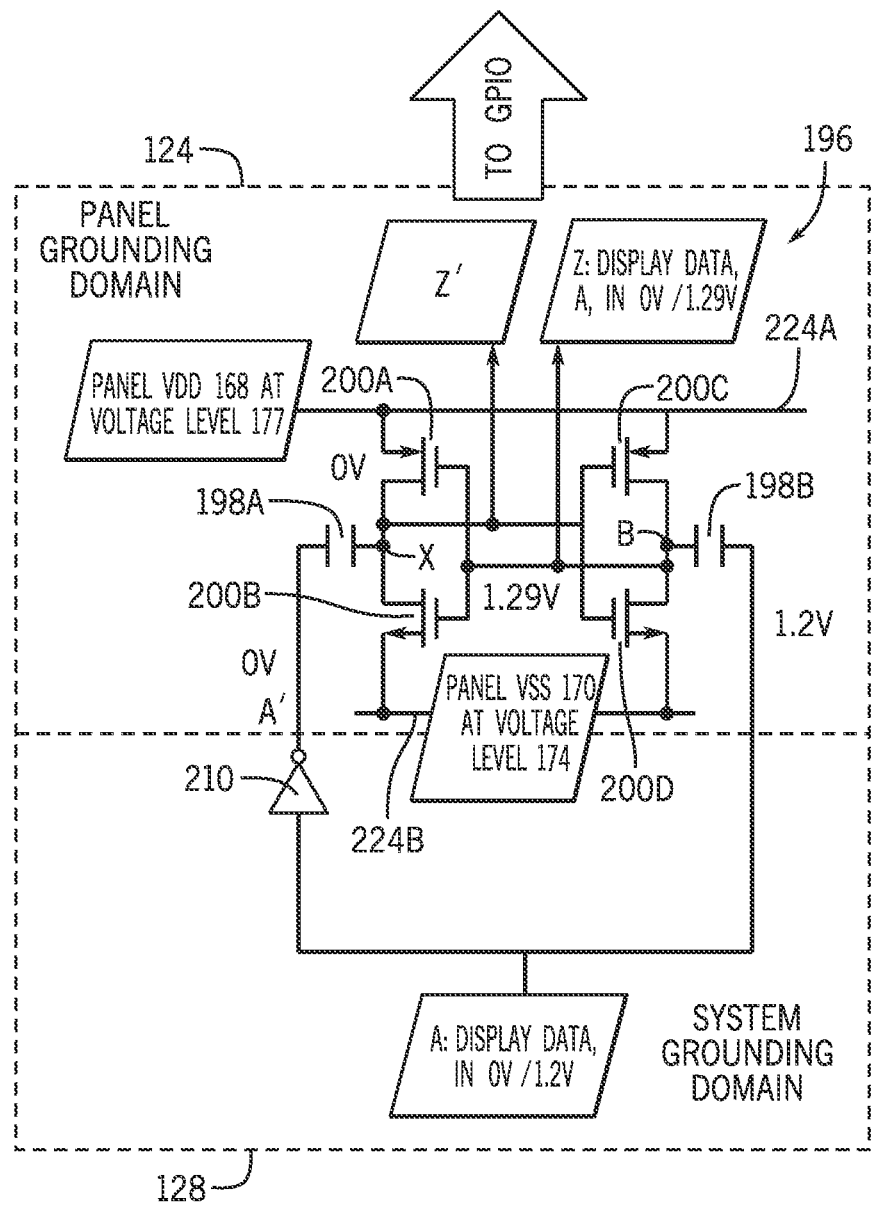
FIG. 10A is a circuit diagram of a general purpose input/output (GPIO) of the image processing circuitry of FIG. 9 transmitting data using a first range of voltages, in accordance with an embodiment.

Referring now to the level shifters 154 of FIG. 9, FIG. 10A is a circuit diagram of a respective level shifter 196 of the level shifters 154 associated with changing voltage levels of data supplied to the GPIO circuitry 156. The level shifter 196 may shift voltage levels of signals to be buffered via corresponding GPIO circuitry 156. The level shifter 196 combines capacitive elements, capacitors 198 (198A, 198B), with back-to-back coupled inverter circuits formed from switches 200 (200A, 200B, 200C, 200D). The capacitors 198 may be rated for relatively high voltage applications (e.g., 20V, greater than or equal to 20V).

The level shifter 196 may receive input data, A, to be shifted from the system grounding domain 128 voltages to the panel grounding domain 124 voltage. The level shifter 196 receives data, A, via one or more input inverters 210 coupled in series with the capacitor 198A. Use of the input inverter 210 may reduce a number of wires used in the electronic device 10 by reducing a complexity of signal distribution networks and still permitting a differential injection to be applied to the capacitors 198. A voltage differential of outputs from the level shifter 196 (e.g., output data Z and Z-inverted (Z')) may match a voltage differential of the differential injection signals applied to the capacitors 198 and represent values of the input data, A, at voltages compatible with the panel grounding domain 124.

The capacitors 198 node voltages may follow the panel VSS 170 and panel VDD 168 in one node, while the other node follow the system VSS 162 and the system VDD 162. When the panel VSS 170 moves from 0V to 5V, the charge to move the other node from 0V to 5V is provided by the back-to-back connected inverter, as discussed below. The capacitor 198A is coupled to a drain of the switch 200A and a drain of the switch 200B, and the capacitor 198B is coupled to a drain of the switch 200C and a drain of the switch 200D. Each switch 200 may be a metal-oxide-semiconductor field-effect transistor (MOSFET) and it should be understood that any suitable type of switching device may be used in place or in addition to the MOSFETs. The switches 200A and 200C may each be p-type MOSFETs (PMOS) and the switches 200B and 200D may each be n-type MOSFETs (NMOS), and it should be understood that these may be interchanged with different types or combinations of switches.

Node X is brought to the panel VSS 170 voltage level from the charging of the capacitor 198A to a voltage difference between the voltage level of Node X and the inverted input data, A', voltage level. Node B is brought to the panel VDD 168 voltage level from the charging of the capacitor 198B to a voltage difference between the voltage level of Node B and the input data, A, voltage level. The SRAM circuit, back-to-back connected two inverters formed by the switches 200C, 200D, 200A and 200B, regenerates the node voltage X and B, holding up the state or memory of the previous value, while the input signal A is decoupled by the direct current waveform blocking (DC-blocking) capacitors 198. Output data, Z and Z-prime (Z'), may transmit from Nodes X and B via conductive paths to the GPIOs 156, to the display drivers 158, to the electronic display 12, or the like. It is noted that input data, A, represents data to be transmitted to a component in the panel grounding domain 124 and thus may be of a logical "1" or a logical "0" value to be translated between the respective voltage levels of the different domains 124, 128. When the input data, A, changes its logical value, the high-frequency nature of the transitional waveform energy that goes through the capacitors 198 may short circuit in high-frequency. The energy is designed to be enough to flip the SRAM stored voltage. The SRAM output, Z, would follow the input data A logical value, in the panel voltage level.

Figure 10B:
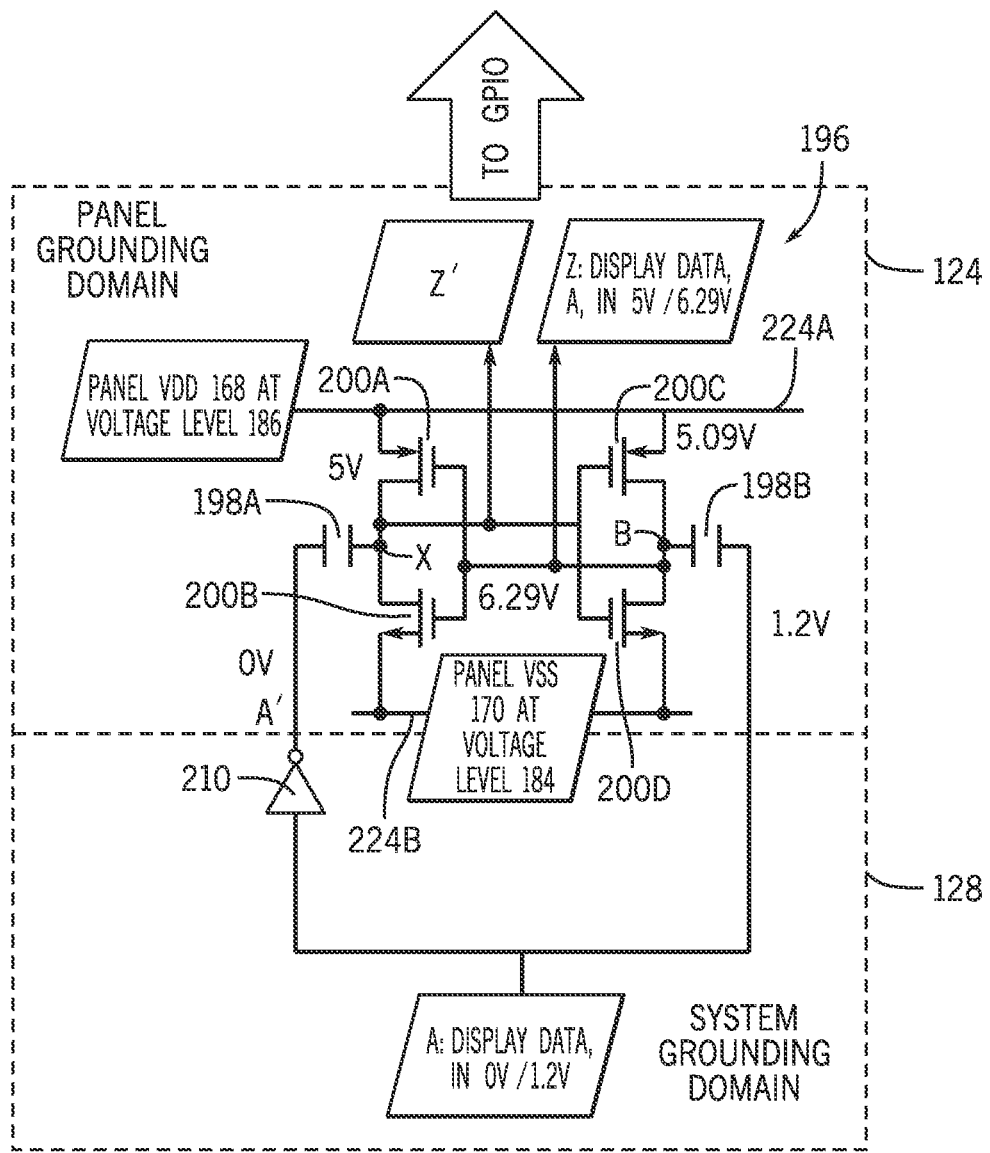
FIG. 10B is a circuit diagram of a general purpose input/output (GPIO) of the image processing circuitry of FIG. 10A transmitting data using a second range of voltages, in accordance with an embodiment.
Figure 11:
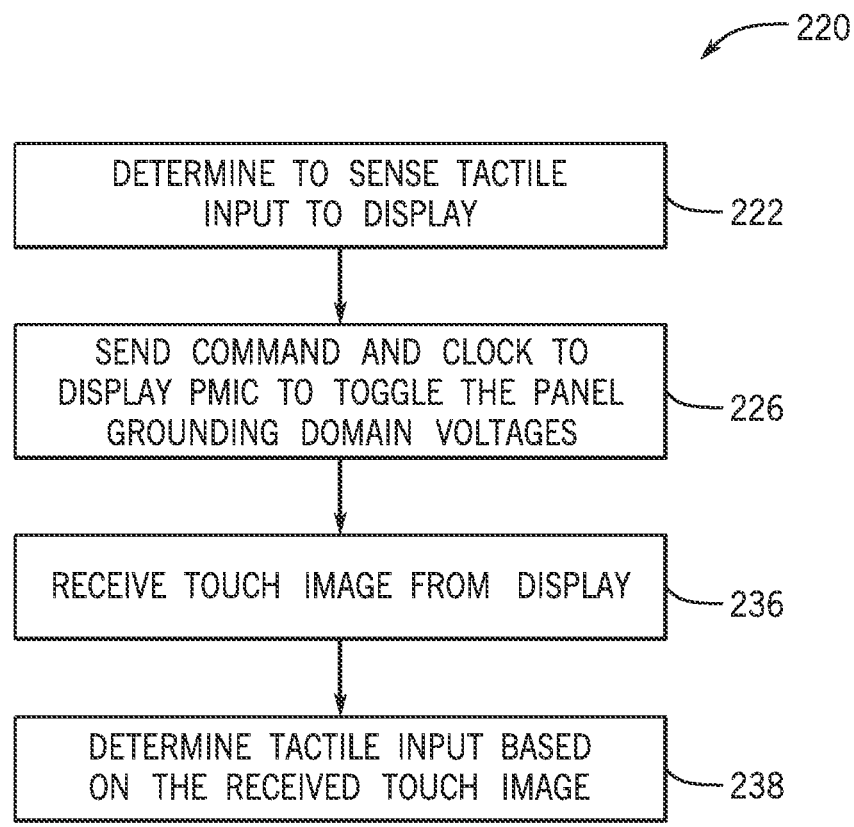
FIG. 11 is a flow diagram of a method for modifying the voltages received by the GPIO of FIGS. 10A-10B, in accordance with an embodiment.

Keeping the foregoing in mind, touch sensing operations may raise the panel ground voltage also supplied to the level shifter 196 via the panel grounding domain 124. To elaborate, FIG. 10B is a circuit diagram of the level shifter 196 receiving the panel VDD 168 and panel VSS 170 having raised voltage values (e.g., the panel VDD 168 having voltage level 186 value or 6.29V, the panel VSS 170 having voltage level 184 value or 5V). Furthermore, FIG. 11 is a flowchart 220 illustrating a process associated with changing (e.g., repeated 0V and 5V waveform pattern on panel VSS) the panel VDD 168 and panel VSS 170 voltage levels. For ease of description, FIGS. 10A-11 are described together herein. Indeed, although certain operations are presented in a particular order, it should be understood that additional or fewer operations may be used in a same or different operational order than that presented below. Furthermore, although described herein as being performed by the control system 134, it should be understood that other circuitry may perform some or all of the operations described herein, such as the display PMIC 172.

At block 222, the control system 134 may determine to sense tactile input to the display 12. To do so, the control system 134 may, at block 226, send a command (e.g., serial peripheral interface (SPI) bus command) and a clock signal to the display PMIC 172 to generate the panel grounding domain 124 voltage waveform (e.g., panel VDD 168, panel VSS 170). At block 236, the control system 134 may receive a touch image from the display 12. The touch image may include sensed capacitance values, such as in a two-dimensional array of values, sensed while the panel grounding domain voltages 124 were toggled multiple times between 0V and 5V. At block 238, the control system 134 may determine a tactile input based at least in part on the received touch image. That is, the control system 134 may determine a relative location of the display 12 that was touched by a finger, stylus, or the like, and may correlate the touched location of the display 12 to a selection of an application, a graphical visualization of a button, an icon, or the like. Touch sensing operations may be repeated, such as periodically or according to a schedule.

Referring back to block 226, when the panel ground voltage in the panel grounding domain 124 remains the same as the system ground, the level shifter 196 may receive signals as illustrated in FIG. 10A. However, when the panel ground voltage waveform is raised to 5V and fully settled, the level shifter 196 internal node voltage is illustrated in FIG. 10B. The display PMIC 172 shifts the voltage waveforms from 0V to 5V in the panel ground domain 124, it shifts the both ground (level 174 in FIG. 10A, to level 184 in FIG. 10B) and power supply (level 177 in FIG. 10A, to level 186 in FIG. 10B) of the level shifter. Therefore, in FIG. 10B, when the display PMIC 172 raised the panel ground domain 124 to 5V, the display data in the system ground domain 128 remains in the 0V/1.2V, while the display data in the panel ground domain 124 moves up to 5V/6.29V domain, representing logical '0' and '1' respectively.

The AC coupling capacitors 198 may isolate relatively higher voltages of the panel grounding domain 124 from the relatively lower voltages of the system grounding domain 128. Indeed, the AC coupling provided by the capacitors 198 in the level shifter 196 may be viewed as DC-block, acting as a high-pass filter, transmitting high speed display data that quickly changes value, yet blocking the relatively slow changing panel VSS 170 (e.g., 5V ground).

Figure 13A:
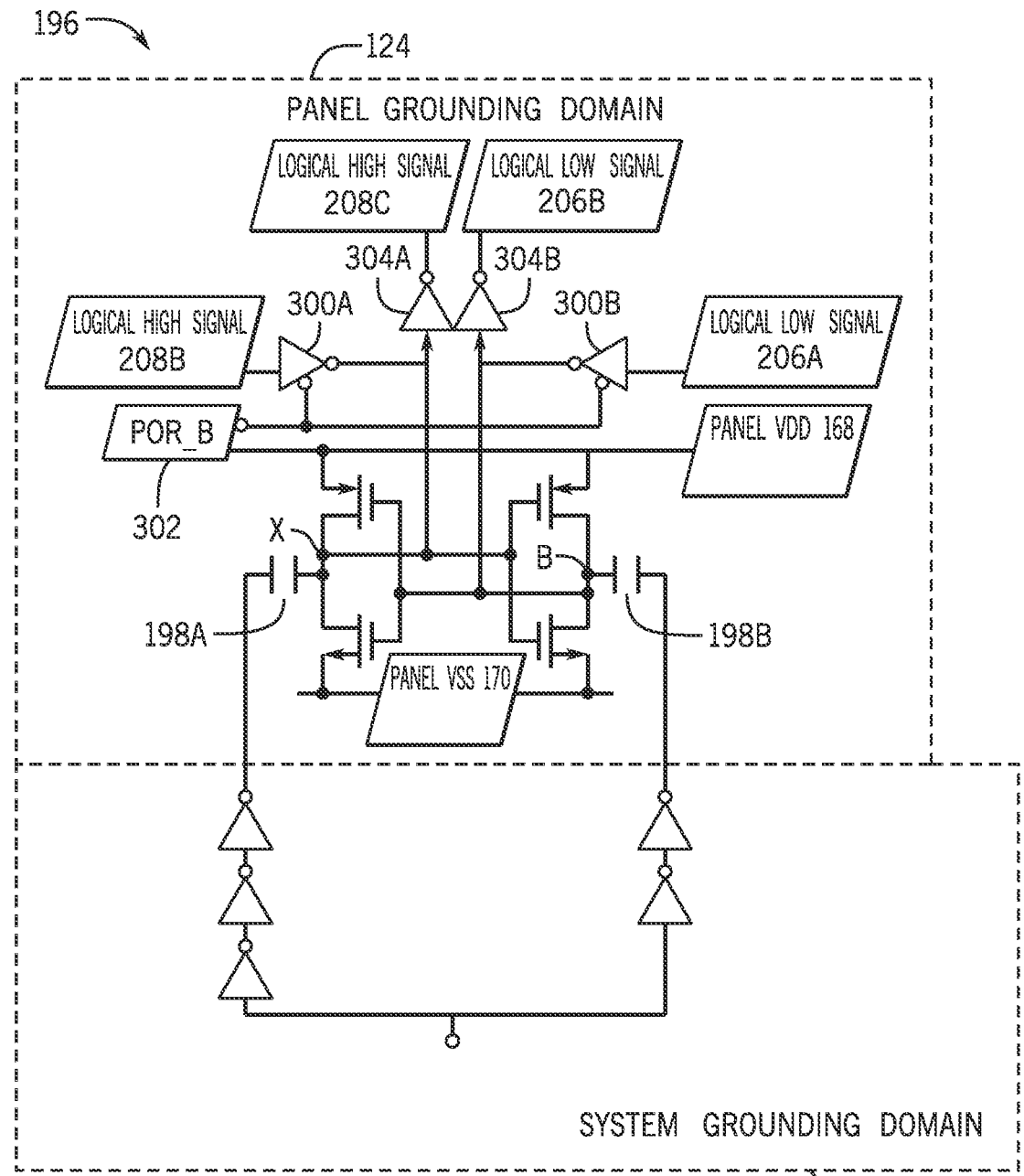
FIG. 13A is a circuit diagram of a general purpose input/output (GPIO) of the image processing circuitry of FIG. 9 including two tri-state buffers and transmitting data using a first range of voltages, in accordance with an embodiment.

When the display PMIC 172 raises the panel grounding domain ground, the level shifter 196 receives the raising voltage waveform to transit from FIG. 10A to finally settled FIG. 10B, the capacitors 198 charge to the voltage level of the panel VSS 170 (e.g., voltage level 184, 5V) when panel VSS 170 has a greater voltage level than the system VSS 164 (e.g., voltage level 174, 0V). The transitional charge, added to the capacitors 198 to make the node voltage A from 0V to 5V, is provided by back-to-back connected inverters (e.g., formed from the switches 200) in the panel grounding domain 124. The transitional charge to the capacitors 198 to maintain the node voltage A', is provided by the inverters 210 (or more as shown in FIGS. 13A and B) in the system grounding domain 128.

Figure 12:
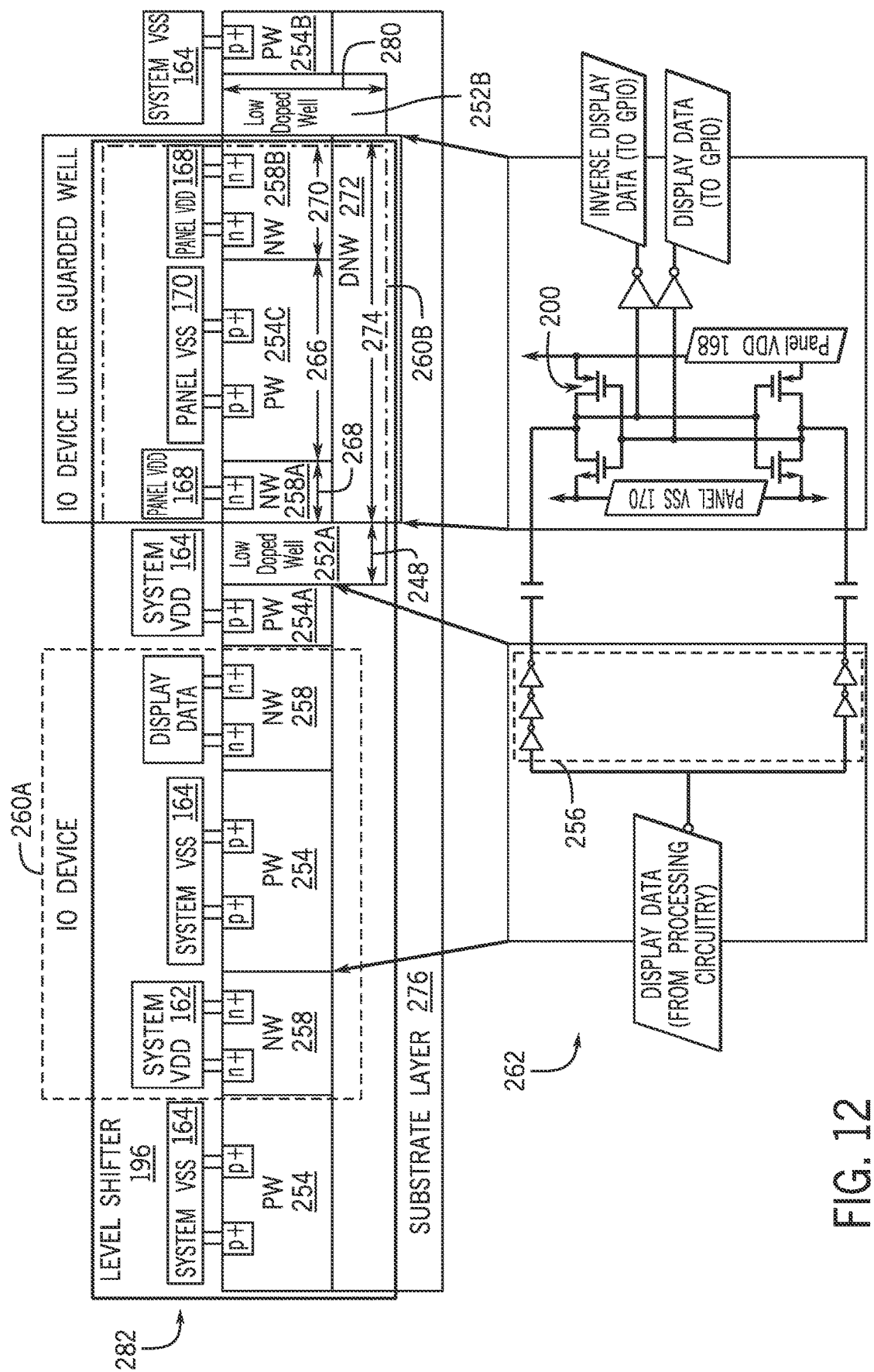
FIG. 12 is a side view of the GPIO of FIGS. 10A-10B with native isolation wells, in accordance with an embodiment.

The ground isolation may be further improved when combined with high voltage well isolation infrastructure diffused within a silicon wafer, which may be considered a compact, low-power, high-voltage isolation circuit integrated into a CMOS integrated circuit. To elaborate, FIG. 12 is a silicon cross-sectional view of the level shifter 196 that includes a high-voltage isolated CMOS, guarded well 260B adjacent to the system ground CMOS well 260A. The guarded well 260B may provide ground isolation from outside ground voltages using a high-voltage isolation well formed from low doped wells 252A, 252B, and deep n-doped well (DNW) 272. These features form what may be conceptualized as a cup, which isolates the well potential in the CMOS devices inside the cup structure (e.g., formed a p-type MOSFET in the NW 258B and a n-type MOSFET in the PW 254C) from the well potential in the CMOS devices outside of the isolation well (e.g., a p-type MOSFET in the NW 258 and a n-type MOSFET in the PW 254). Each low doped well 252A, 252B may not be implanted with p-type or n-type dopants so may have no doping concentration. The wells 252A, 252B may be formed adjacent to p-wells 254 (254A, 254B), or wells implanted with p-type dopant, and may increase break-down voltage in the P-N junction. The p-wells 254 and n-wells 258 may be powered by the system PMIC 144, while the p-wells 254C and n-well 258A, 258B may be powered by the display PMIC 172. The isolation well formed from low doped wells 252 and the DNW 272 may have a breakdown voltage level greater than a difference in voltage level between the system PMIC 144 system ground voltage (VSS) 164 level and the display PMIC 172 power supply voltage level while raised, such as a breakdown voltage level that equals or is substantially equal to twice the difference, three times the difference, and so on. The high-voltage isolation well may be formed from a very low-doped, as low or zero dopant like a native silicon, isolation wells, as described herein. In this way, ground isolation circuitry that isolates the panel grounding domain 124 from the system grounding domain 128 may include the isolation well and an input/output device disposed within the isolation well formed from some of the p-wells 254 and n-wells 258. The high-voltage isolation wells 252 and the DNW 272 may also be trench features formed based on a trench technology, silicon-on-insulator technology, selective etching technology, and so forth.

The p-wells 254 and n-wells 258 may form CMOS devices, and thus inverters 256. The boundary between p-wells 254 and n-wells 258 may have a relatively low breakdown voltage. Thus, to increase this breakdown voltage, the additional barrier of the isolation well is added. The low doped wells 252 and DNW 272 may be formed from using any suitable technique of mask design in lithography or any suitable implantation methods, or deposition methods, or the like such as to lower the doping concentrate, resulting in greater resistance and greater breakdown voltages of the isolation well.

Inset FIG. 262 diagrammatically correlates the circuitry physical location of FIG. 10A and FIG. 10B with cross-sectional layers of FIG. 12 and shows how the level shifter 196 may include guarded IO devices within the isolation well 260B and the IO devices outside the isolation well 260A. The unguarded IO devices located the well 260A formed on top of substrate layer 276 is represented with inverters 256 in the inset FIG. 262 and thus may also include switches not specifically shown in the inset FIG. 262. It should be noted that additional or alternative wells, layers, components, or the like may be used in the level shifter 196, and FIG. 12 is an example of a cross-section of suitable circuitry. It should be understood that each layer illustrated in FIG. 12 may extend into or out of the page, include any number of devices, and/or extend in any spatial direction (e.g., positive and negative z-, y-, and/or x-axis directions), although not particularly illustrated.

The low doped wells 252 may each have a respective width 248 equal to a value such as 0.5 micrometers (μm), or 10 μm, such as equal or substantially similar to 0.5 μm, 1.0 μm, 1.5 μm, or the like. The zero or low doping of the isolation wells (e.g., the low doped wells 252, the DNW 272) may increase break-down voltage of the isolation. It is noted that N+ and P+ indicate well taps from metal disposed above.

The isolation well may increase a breakdown voltage level of PN junctions (e.g., PN junction breakdown voltage) to be greater than a difference between a value of the panel VDD 168 and a value of the system VSS 164. For example, the breakdown voltage of the PN junction between p-well 254A and n-well 258A adjacent to the isolation well may be equal to or greater than the 6.29V in this particular use-case scenario 186, such as a value greater than 20V, 50V, 100V, or any suitable value. Without the isolation well 252, PN junctions of p-wells 254 and n-wells 258 may have lower breakdown voltages. It is noted that breakdown voltage could be typically around 2.5V, such as between 2V to 3V, in modern nanometer CMOS technology nodes. The greater a breakdown voltage level of the PN junction, the greater voltages are able to be withstood by the CMOS device formed from the n-wells 258A, B and the p-wells 254C. Indeed, including one or more isolation wells may increase an amount of voltage able to be withstood at PN junctions, and thus by the CMOS device overall, which may reduce a likelihood of or risk of voltage breakdown occurring at a PN junction.

In some cases, it may be desired for the level shifter 196 to have its nodes reset to a known state after powering up. To do so, a tri-state buffer may be included to set a value of an output from the level shifter 196.

Figure 13B:
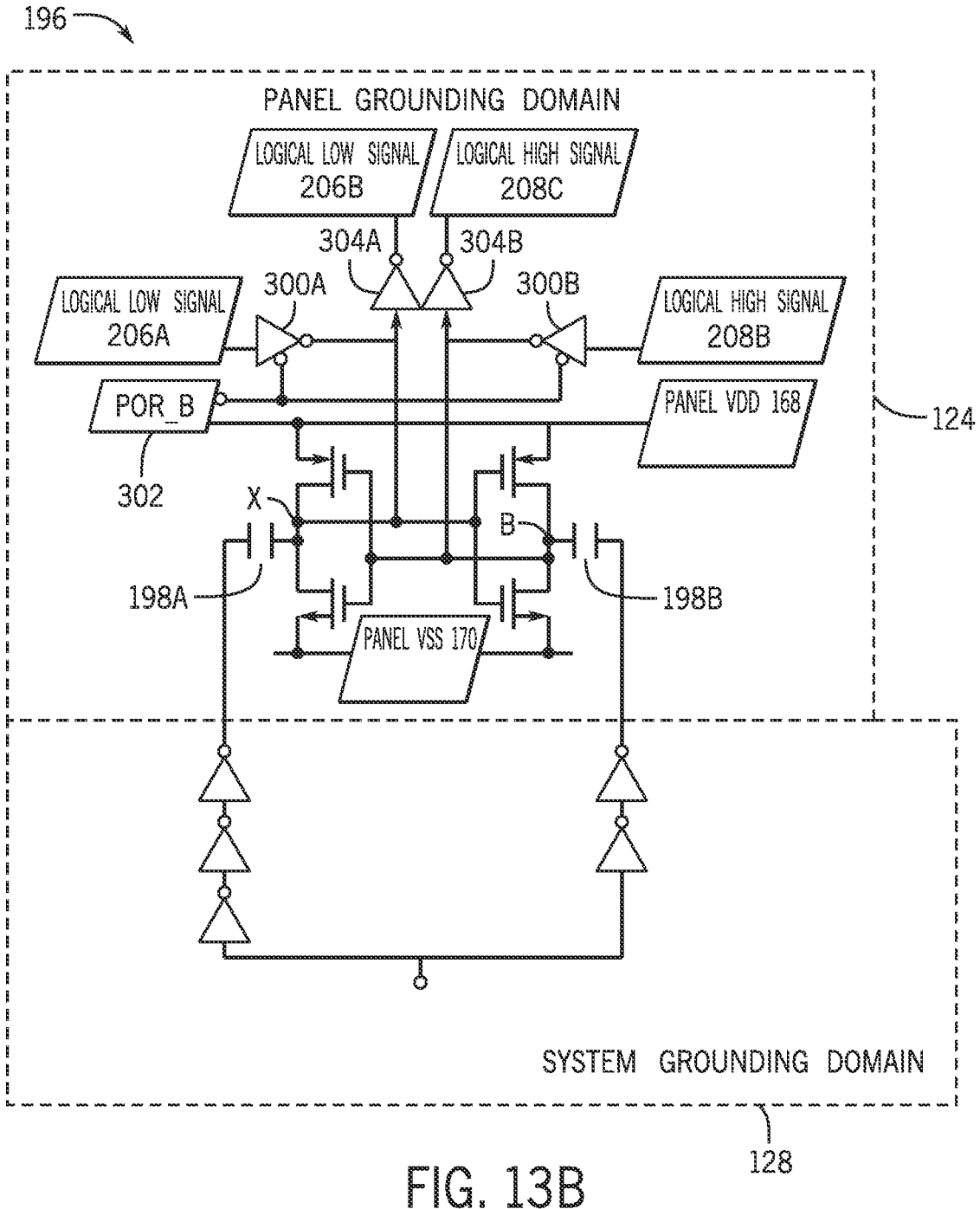
FIG. 13B is a circuit diagram of the general purpose input/output (GPIO) of FIG. 13A including the two tri-state buffers and transmitting data using a second range of voltages, in accordance with an embodiment.

To elaborate, FIG. 13A is a circuit diagram of the level shifter 196 including tri-state buffers 300 (300A, 300B) receiving a first combination of inputs and FIG. 13B is a circuit diagram of the level shifter 196 receiving a second combination of inputs. For ease of description, FIGS. 13A and 13B are discussed together herein.

In FIG. 13A, the tri-state buffer 300A receives a logical high signal 208B and the tri-state buffer 300B receives a logical low signal 206A. The level shifter 196 receives power and ground via panel VSS 170 and panel VDD 168. When a Power-on Reset control signal (POR_B 302) activates the tri-state buffers 300, the level shifter 196 outputs a logical high signal 208C from inverter 304A and the logical low signal 206B from inverter 304B. The outputs from the inverters 304 set the voltage on Nodes A and B and the back-to-back connected inverters (SRAM) holds the node voltages.

Inversely, in FIG. 13B, the tri-state buffer 300B receives the logical high signal 208B and the tri-state buffer 300A receives the logical low signal 206A. When the Power-on Reset control signal, POR_B 302, activates the tri-state buffers 300, the level shifter 196 is operated to output logical low signal 206B from inverter 304A and logical high signal 208C from inverter 304B. The outputs from the inverters 304 sets the voltage on Nodes A and B and the back-to-back connected inverters (SRAM) holds the node voltages.

The tri-state buffers 300 predictably set outputs from the level shifter 196, overriding otherwise random outputs from the level shifter 196 due to the unpredictable nature of the initial state regenerated in the back-to-back inverter pair (e.g., memory device or memory cell formed from the switches 200) after the electronic device 10 is powered up for the first time. The memory cell state may have an expected value in response to the Power-on Reset control signal, POR_B 302. Having a configurable output from the level shifter 196 may be desirable since certain control operations may be based on and/or triggered from the level shifter 196 output.

In some cases, a GPIO may receive data from the electronic display 12 to the image processing circuitry 146 as opposed to from the image processing circuitry 146 to the electronic display 12 as is described above. The level shifter 196 may then reverse its shifting operations to shift voltages of data from the panel grounding domain 124 to the system grounding domain 128.

Figure 14:
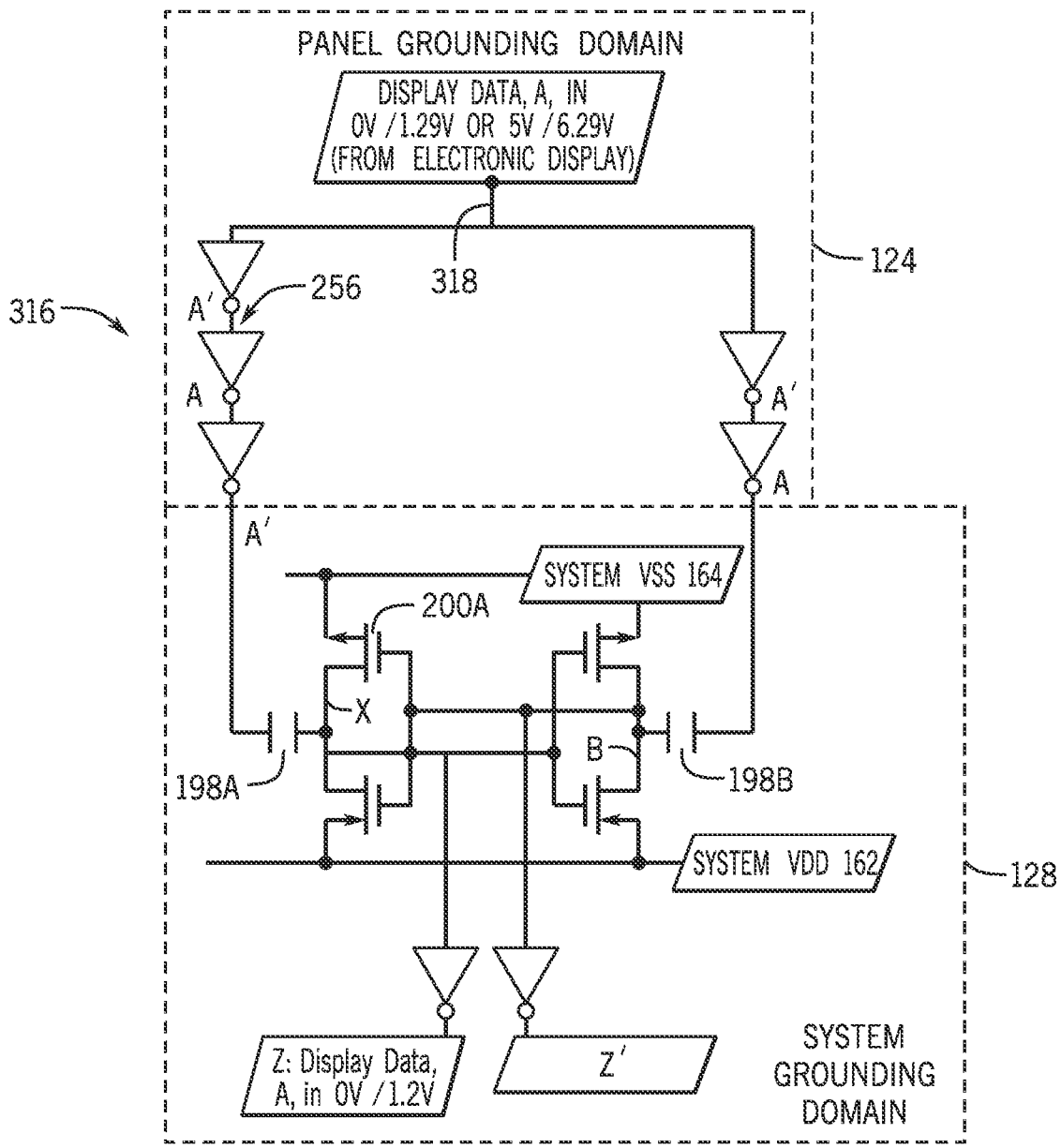
FIG. 14 is a circuit diagram of the general purpose input/output (GPIO) of FIG. 10A the image processing circuitry of FIG. 9 including the two tri-state buffers and transmitting data using a second range of voltages, in accordance with an embodiment.

To elaborate, FIG. 14 is a circuit diagram of a respective level shifter 316 used with GPIO circuitry 156 to receive data from the electronic display 12 to downstream circuitry, such as the image processing circuitry 136. The level shifter 316 may operate according to the same operational methods as the level shifter 196 of FIGS. 10A and 10B, and thus similar descriptions are relied upon herein.

FIG. 14 shows the level shifter 316 receiving data from the panel grounding domain 124 and level-shifting data to the system grounding domain 128. The level shifter 316 may receive the data, A, having raised voltage values (e.g., 5V/6.29V) or having unraised voltage values (e.g., 0V/1.29V) from the electronic display 12. Capacitor 198B stores a voltage difference between the panel grounding domain 124 and the system grounding domain 128. Voltage of Node B may follow the power supply and ground voltages of the system grounding domain 128, according to the SRAM polarity stored by the switches 200. Control signals from the capacitors 198 may turn on one or more switches 200. When one or more of the switches 200 turn on, the corresponding current generated is transmitted to the image processing circuitry 146 or downstream devices of the electronic device 10 as output data, Z, or inverted output data, Z'. This output data is transmitted from the level shifter 316 at voltage levels suitable for the system grounding domain 128. For example, the level shifter 316 may move the output display data, A, from 1.29V to 1.2V, 5V to 0V, or 6.29V to 1.2V, based on the whether or not the panel grounding domain 124 is operating with toggled voltage levels and what the original value of the output display data, A, was when input into the level shifter 316. Since data from the electronic display 12 is supplied in a voltage level of the system grounding domain 128, some portions of the image processing circuitry 146 may not be rated to the higher voltage levels that circuitry of the panel grounding domain 124 are rated.

It is noted that the level shifter 196 may flip its output voltage after receiving an opposite polarity signal from the capacitors 198 relative to voltages of Nodes A and B. By including capacitors 198 with the back-to-back coupled inverters, the level shifter 196 flips in output in response to a differential injection based on the voltage difference between an inverse of a signal received at capacitor 198A and the signal received at capacitor 198B.

Furthermore, level shifter 196 may hold its output steady. Even as voltage outputs from the inverters 304 are distributed through the integrated image pixel and touch sensor array 126, the level shifter 196 output may be characterized by a consistent signal integrity and strength. This circuit design for the level shifter 196 also maintains an output voltage when power supplied from the display PMIC 172 or system PMIC 144 dips or changes. This may permit the display PMIC 172 to reduce or stop supply of some of the signals to the level shifter 196. The level shifter 196 may be able to hold its output even while power supplied to the electronic display 12 is ramping up or is changing. By using this system, power consumed by the electronic device 10 may reduce. Power consumption may be reduced since the capacitor and its corresponding node remain the highest voltage node in the level shifter 196 and thus reduce overall power losses.

It is noted these ground isolation circuitry systems and methods may be used in alternative and additional applications. For example, the ground isolation circuitry systems and methods may improve operations where some voltages are to be isolated from other voltages. Indeed, systems like uninterruptible power supplies, memory systems, encryption key systems, or the like may benefit from these ground isolation circuitry systems and methods. The systems and methods describe above use differential injections to the capacitors 198.

Figure 15:
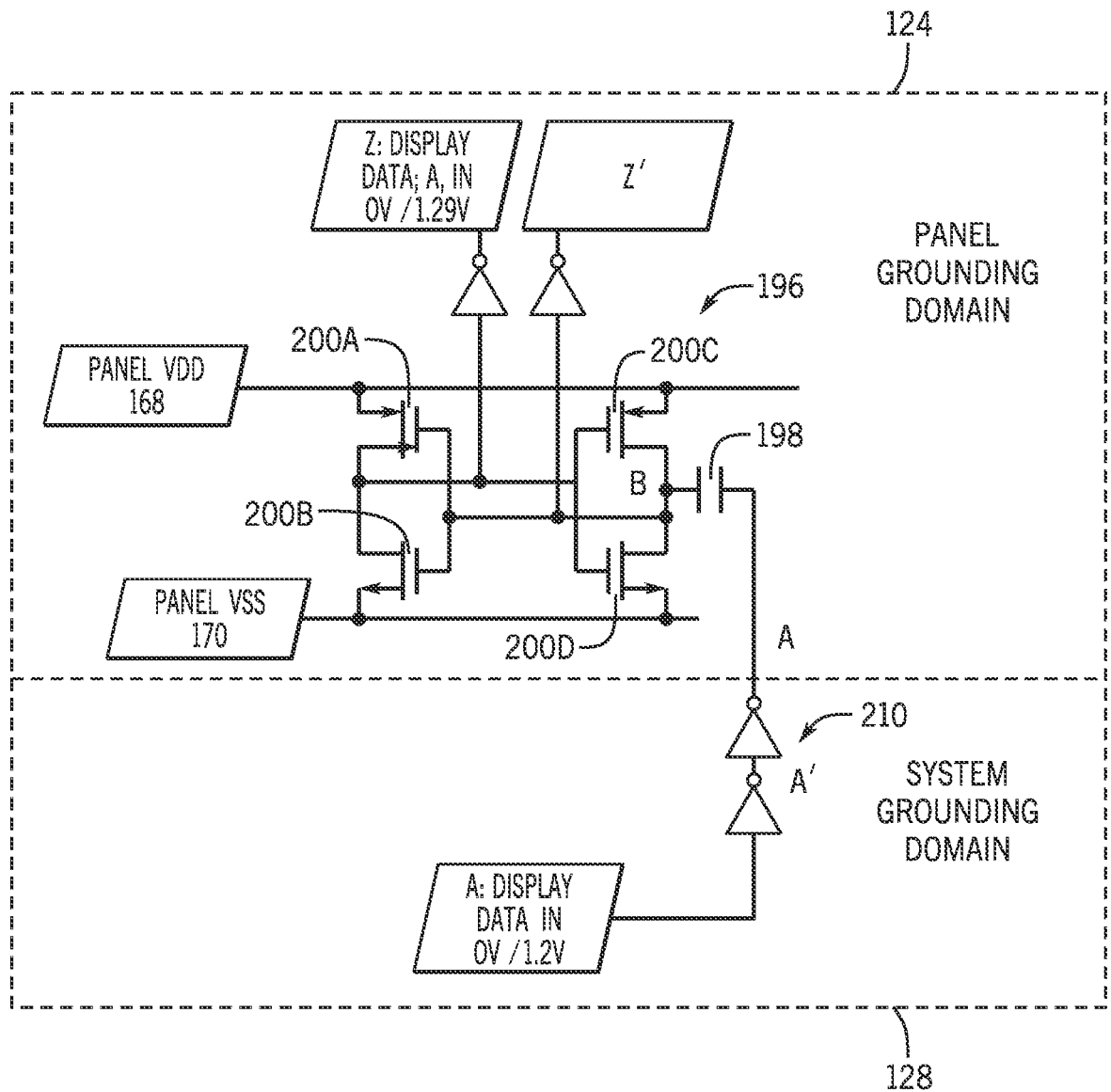
FIG. 15 is a circuit diagram of a single-ended example of the circuitry of at least FIG. 10A, in accordance with an embodiment.

It should be understood that although the circuit drawn in FIG. 10 and FIG. 13 uses differential injection using two DC blocking capacitors 198A and 198B, the same applies to a single-ended operations. FIG. 15 is a circuit diagram of example singled-ended operations. Although differential injection provides noise-immunity and solid operation, single-ended operations may be additionally beneficial by providing similar ground isolation outcomes with less circuitry, less area, less power consumption (e.g., one capacitor 198 as opposed to two capacitors 198 for each guarding circuit) relative to the differential operation. FIG. 15 illustrates the single ended circuit, with one buffer (e.g., input inverter 210) and one capacitor 198 is connected to one of the two nodes in the SRAM cell.

Indeed, display data, A, may be received at inverters 210. The display data, A, and supply voltages, panel VDD 168 and Panel VSS 170, may charge the capacitor 198 and enable the level shifter 196 to output the display data in the adjusted voltage domain, panel grounding domain 124. The level shifter 196 may output the adjusted data as display data, Z, in 0V or 1.29V and as inverse display data, Z'.

Technical effects include using isolation well systems and methods to isolate grounds used by an integrated panel and those used by other circuitry of the electronic device. Isolation capabilities may further improve when an isolation well is shared by a GPIO and a level shifter, further reducing component footprint of the electronic device. The guarding systems described herein are integrated into complementary metal-oxide-semiconductor (CMOS) structures and may have a relatively smaller footprint than other isolation methods (e.g., be the width of a human hair), such as isolation transformers and optocouplers. Furthermore, the guarding systems described herein may be considered passive isolation methods and may further reduce power losses by a touch sensor panel by reducing a number of relatively high voltage nodes maintained during touch sensing operations. Image processing circuitry may use the guarding system (e.g., ground isolation circuitry) when communicating with an electronic display to enable communication of display data, touch data, or both between a panel grounding domain and a system grounding domain regardless of a voltage difference between a system ground voltage used by components outside of the electronic display and a panel ground voltage used by the electronic display.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. An electronic device, comprising:
a plurality of display pixels arranged in a display pixel array, wherein each of the plurality of display pixels receive display data and emit light according to image;
a plurality of touch sensors from respective intersections of column electrodes and row electrodes arranged in a touch sensor array, wherein the column electrodes and the row electrodes are configured to transmit respective touch image data as part of a touch sensing operation based at least in part on a panel ground voltage;

ground isolation circuitry disposed between a panel grounding domain and a system grounding domain, wherein the ground isolation circuitry comprises a memory cell disposed in an isolation well, wherein the memory cell is capacitively coupled to the system grounding domain, wherein the panel grounding domain corresponds to the panel ground voltage, wherein the system grounding domain corresponds to a system ground voltage, wherein the panel ground voltage is configured to change between having a value equal to the system ground voltage and having a second ground voltage greater than the system ground voltage, and wherein the panel ground voltage comprises a changing waveform; and image processing circuitry configured to communicate the display data, touch data, or both between the panel grounding domain and the system grounding domain using the ground isolation circuitry regardless of a voltage difference between the system ground voltage and the panel ground voltage.

2. The electronic device of claim 1, wherein the isolation well is associated with a well junction breakdown voltage.

3. The electronic device of claim 2, wherein the well junction breakdown voltage is configured to be greater than a difference in potential between a panel supply voltage and the system ground voltage, wherein the panel supply voltage corresponds to a supply voltage greater than the system ground voltage and the second ground voltage.

4. The electronic device of claim 2, wherein the isolation well comprises an isolation well formed from dopant blocking operations.

5. The electronic device of claim 1, wherein the ground isolation circuitry comprises an isolation well and an input/output device disposed within the isolation well.

6. The electronic device of claim 1, comprising a data driver, a scan driver, a touch driver interface, and a touch sense interface, wherein each of the data driver, the scan driver, the touch driver interface, and the touch sense interface are formed in a single substrate configured to provide an integrated panel comprising the touch sensor array and the display pixel array.

7. The electronic device of claim 1, wherein the ground isolation circuitry is configured to step up or to step down a voltage level of a data signal between two or more power domains.

8. The electronic device of claim 7, wherein the memory cell is connected to a capacitive element.

9. The electronic device of claim 1, wherein the memory cell comprises back-to-back connected inverter formed from at least a first switch, a second switch, a third switch, and a fourth switch, wherein a first output node is connected to a drain of the first switch, a drain of the second switch, a gate of the third switch, and a gate of the fourth switch, and wherein a second output node is connected to a drain of the third switch, a drain of the fourth switch, a gate of the first switch, and a gate of the second switch.

10. The electronic device of claim 1, wherein the ground isolation circuitry comprises a tri-state buffer configured to connect to the memory cell and is configured to output a digital signal in response to a power-on reset (POR) signal.

11. A circuit, comprising:
an isolation well disposed between a first power domain and a second power domain, wherein the second power domain corresponds to a variable voltage; and
a memory device disposed in the isolation well, wherein the memory device is operable to preserve a state of an output voltage, wherein the memory device is configured to receive signals from first power domain via a capacitive coupling to the first power domain.

12. The circuit of claim 11, comprising a downstream input/output device, wherein the memory device comprises static random access memory configured to be connected between a capacitor and an input to the downstream input/output device.

13. The circuit of claim 12, wherein the isolation well separates a first p-type well from a first n-type well, wherein the first p-type well and the first n-type well are characterized by a first PN junction breakdown voltage, and wherein the isolation well, the first p-type well, and the first n-type well are characterized by a second PN junction breakdown voltage greater than the first PN junction breakdown voltage.

14. A device, comprising:
an isolation well formed from at least a first trench feature disposed on a substrate layer, wherein the first trench feature is formed at a boundary between a first power domain and a second power domain;
a first input/output device formed outside the first trench feature, wherein the first input/output device receives static voltages of the second power domain; and
a second input/output device formed inside the isolation well, wherein the second input/output device receives variable voltages of the first power domain, and wherein the second input/output device comprises a memory device capacitively coupled to the second power domain.

15. The device of claim 14, wherein the second input/output device is configured to transmit a data signal received by the first input/output device to an integrated display pixel and touch sensor display panel after adjusting a voltage level of the data signal to the variable voltages of the first power domain.

16. The device of claim 14, comprising a capacitive element between an output of the first input/output device and a node of the second input/output device, wherein the variable voltages of the first power domain comprises a variable supply voltage configured to change between a first voltage level and a second voltage level greater than the first voltage level, and wherein the capacitive element has a breakdown voltage level greater than the second voltage level.

17. The device of claim 16, wherein the isolation well separates a first p-type well from a first n-type well of the second input/output device, wherein the first p-type well and the first n-type well are characterized by a first PN junction breakdown voltage, and wherein the isolation well, the first p-type well, and the first n-type well are characterized by a second PN junction breakdown voltage greater than the first PN junction breakdown voltage.

18. The device of claim 14, wherein the first trench feature is configured to isolate variable ground voltages of the first power domain and static ground voltages of the second power domain.

19. The circuit of claim 11, wherein the isolation well and the memory device correspond to single-ended circuit.

20. The device of claim 14, wherein the isolation well comprises:
the first trench feature comprising a first region of native silicon formed between a first depth and a second depth, wherein the second depth is greater than the first depth; and a n-type well formed between a third depth and a fourth depth, wherein the third depth is greater than the first depth, and wherein the fourth depth is greater the first depth and the third depth.

* * * * *